United States Patent
Lert, Jr. et al.

(10) Patent No.: US 9,064,359 B2
(45) Date of Patent: Jun. 23, 2015

(54) SYSTEM FOR QUEUE AND SERVICE MANAGEMENT

(75) Inventors: John G. Lert, Jr., Watertown, MA (US); Jesse Brouhard, Sharon, MA (US); Ajay R. Bam, Cambridge, MA (US)

(73) Assignee: MODIV MEDIA, INC., Quincy, MA (US)

( * ) Notice: Subject to any disclaimer, the term of this patent is extended or adjusted under 35 U.S.C. 154(b) by 1669 days.

(21) Appl. No.: 11/952,768

(22) Filed: Dec. 7, 2007

(65) Prior Publication Data

US 2009/0076875 A1    Mar. 19, 2009

Related U.S. Application Data

(63) Continuation-in-part of application No. 11/607,283, filed on Dec. 1, 2006, now Pat. No. 7,752,146.

(60) Provisional application No. 60/741,963, filed on Dec. 2, 2005.

(51) Int. Cl.
*G06Q 10/06* (2012.01)
*G06Q 99/00* (2006.01)
(Continued)

(52) U.S. Cl.
CPC ............ *G07C 11/00* (2013.01); *G06Q 10/0631* (2013.01); *G06Q 99/00* (2013.01);
(Continued)

(58) Field of Classification Search
CPC .............. H04M 3/523; H04M 3/5232; G06Q 10/0631; G06Q 10/06311; G06Q 20/20; G06Q 20/209; G06Q 99/00
USPC ........................ 705/7.12, 7.13, 16, 24, 500; 379/265.01, 265.05
See application file for complete search history.

(56) References Cited

U.S. PATENT DOCUMENTS

| 4,398,257 A | 8/1983 | Paganini et al. |
| 5,006,983 A | 4/1991 | Wayne et al. |

(Continued)

FOREIGN PATENT DOCUMENTS

| DE | 10118766 | 3/2006 |
| EP | 00195587 | 3/1986 |

(Continued)

OTHER PUBLICATIONS

Microsoft Press Computer Dictionary, Third Edition, Microsoft Press, Redmond, 1997, p. 430.*

(Continued)

*Primary Examiner* — Nicholas D Rosen
(74) *Attorney, Agent, or Firm* — Pillsbury Winthrop Shaw Pittman LLP

(57) ABSTRACT

A system for service queue management is disclosed including a terminal controlled by the system having a processing platform to generate service queue information for a user, and a mechanism for the user to request or receive the service queue information. The processing platform preferably transmits promotions related to goods and services associated with the service queue information to a user. The mechanism for the user to request or receive service queue information may preferably include a user's mobile communications device or a manually-activated device located on the terminal. Service queue information may include a queue number, next queue number to be issued, estimated wait time for service, a predicted time of service, time of issuance of ticket, predicted queue-waiting time, marketing messages, instructions for use of said ticket dispenser, and average queue-waiting time.

49 Claims, 14 Drawing Sheets

(51) Int. Cl.

| | | |
|---|---|---|
| *G07C 11/00* | (2006.01) | |
| *G06Q 20/20* | (2012.01) | |
| *G06Q 30/00* | (2012.01) | |
| *G06Q 30/02* | (2012.01) | |
| *H04M 3/523* | (2006.01) | |

(52) U.S. Cl.
CPC ....... *G06Q 20/209* (2013.01); *G06Q 10/06311* (2013.01); *G06Q 20/20* (2013.01); *G06Q 30/016* (2013.01); *G06Q 30/02* (2013.01); *G06Q 30/0229* (2013.01); *G07C 2011/04* (2013.01); *H04M 3/5238* (2013.01)

(56) References Cited

U.S. PATENT DOCUMENTS

| | | | |
|---|---|---|---|
| 5,245,163 | A | 9/1993 | Bar-Yehuda et al. |
| 5,295,064 | A | 3/1994 | Malec et al. |
| 5,502,806 | A | 3/1996 | Mahoney et al. |
| 5,504,675 | A | 4/1996 | Cragun et al. |
| 5,866,890 | A | 2/1999 | Neuner |
| 5,974,393 | A | 10/1999 | McCullough et al. |
| 6,023,681 | A * | 2/2000 | Whitt ............................ 705/7.29 |
| 6,059,184 | A | 5/2000 | Ahlstrom et al. |
| 6,435,407 | B1 | 8/2002 | Fiordelisi et al. |
| 6,496,580 | B1 | 12/2002 | Chack |
| 6,615,175 | B1 * | 9/2003 | Gazdzinski ................... 704/275 |
| 6,694,009 | B1 | 2/2004 | Anderson et al. |
| 6,959,078 | B1 * | 10/2005 | Eilbacher et al. ........ 379/265.03 |
| 7,062,469 | B2 | 6/2006 | Meyers et al. ................... 705/64 |
| 7,242,307 | B1 | 7/2007 | LeBlond et al. |
| 7,945,463 | B2 | 5/2011 | Sussman et al. ................... 705/5 |
| 7,949,123 | B1 | 5/2011 | Flockhart et al. ........ 379/266.03 |
| 2002/0087335 | A1 * | 7/2002 | Meyers et al. ..................... 705/1 |
| 2002/0107728 | A1 * | 8/2002 | Bailey et al. ..................... 705/14 |
| 2002/0143655 | A1 | 10/2002 | Elston et al. |
| 2002/0156682 | A1 | 10/2002 | DiPietro |
| 2003/0046106 | A1 * | 3/2003 | Tsunoda ........................... 705/1 |
| 2003/0061078 | A1 | 3/2003 | Shimosako et al. |
| 2003/0074222 | A1 * | 4/2003 | Rosow et al. ..................... 705/2 |
| 2003/0132288 | A1 * | 7/2003 | Fulcher et al. ............... 235/381 |
| 2003/0188300 | A1 | 10/2003 | Patrudu |
| 2004/0019501 | A1 * | 1/2004 | White et al. ..................... 705/2 |
| 2004/0059614 | A1 | 3/2004 | Brown et al. |
| 2004/0076282 | A1 | 4/2004 | Leijonhufvud |
| 2004/0193526 | A1 | 9/2004 | Singer et al. |
| 2004/0225397 | A1 | 11/2004 | Gotfried |
| 2004/0252820 | A1 | 12/2004 | Faber et al. |
| 2005/0080651 | A1 | 4/2005 | Morrison et al. |
| 2005/0080675 | A1 * | 4/2005 | Lovegreen et al. ............. 705/15 |
| 2005/0125278 | A1 | 6/2005 | Vajracharya et al. |
| 2005/0125439 | A1 | 6/2005 | Nourbakhsh et al. |
| 2005/0129214 | A1 | 6/2005 | Tyagarajan et al. |
| 2005/0193328 | A1 * | 9/2005 | Agrawala et al. ............. 715/513 |
| 2005/0251326 | A1 * | 11/2005 | Reeves ........................... 701/200 |
| 2005/0266879 | A1 * | 12/2005 | Spaur et al. ................. 455/556.2 |
| 2005/0267820 | A1 * | 12/2005 | Zheng ............................. 705/27 |
| 2007/0055554 | A1 * | 3/2007 | Sussman et al. ................... 705/5 |
| 2007/0127690 | A1 * | 6/2007 | Patakula et al. .......... 379/265.05 |
| 2007/0201673 | A1 | 8/2007 | Annadata et al. |
| 2008/0189173 | A1 | 8/2008 | Bakar et al. |

FOREIGN PATENT DOCUMENTS

| | | |
|---|---|---|
| EP | 01248448 | 10/2002 |
| WO | WO-02/45438 | 6/2002 |
| WO | WO-02/077928 | 10/2002 |
| WO | WO 2004012030 | 2/2004 |
| WO | WO-2006/110650 | 10/2006 |
| WO | WO-2007/064996 | 6/2007 |

OTHER PUBLICATIONS

International Search Report and the Written Opinion issued for PCT/US2008/085221, dated Mar. 3, 2009; 11 pages.

Anon., "United Airlines: United Continues to Leverage Technology to Improve the Customer Experience; United Eliminates Paper Tickets," M2 Presswire, Aug. 8, 2002, 2 pgs.

International Search Report and Written Opinion issued for PCT/US2006/046235; Dated: Aug. 8, 2008; 15 Pages.

U.S. Appl. No. 10/646,579, filed Apr. 29, 2004, Ajay Bam.

U.S. Appl. No. 10/691,459, filed Jul. 1, 2004, Ajay Bam.

U.S. Appl. No. 10/877,093, Ajay Bam.

* cited by examiner

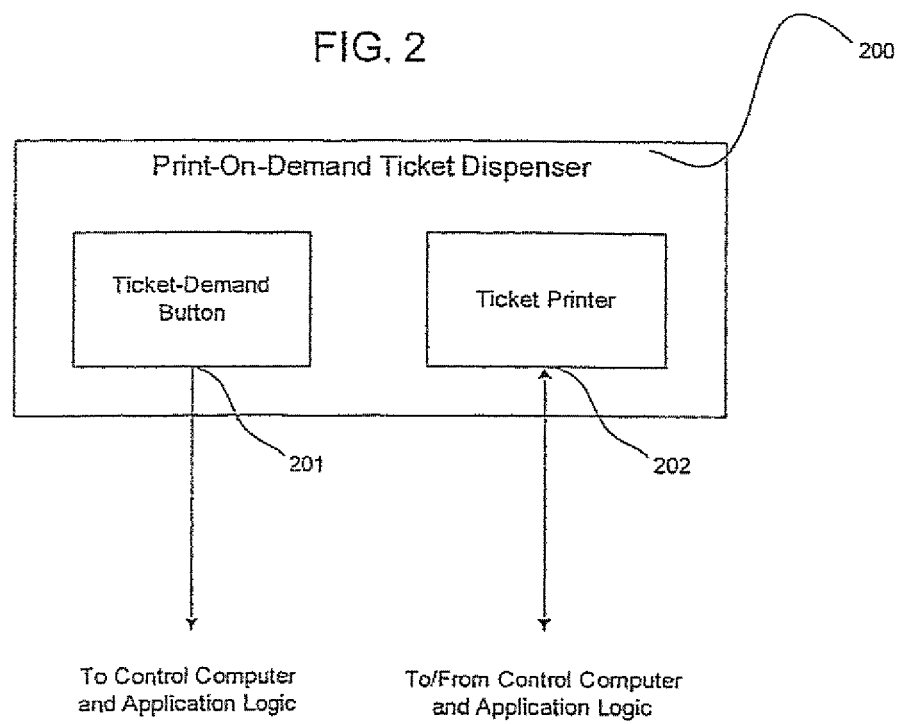

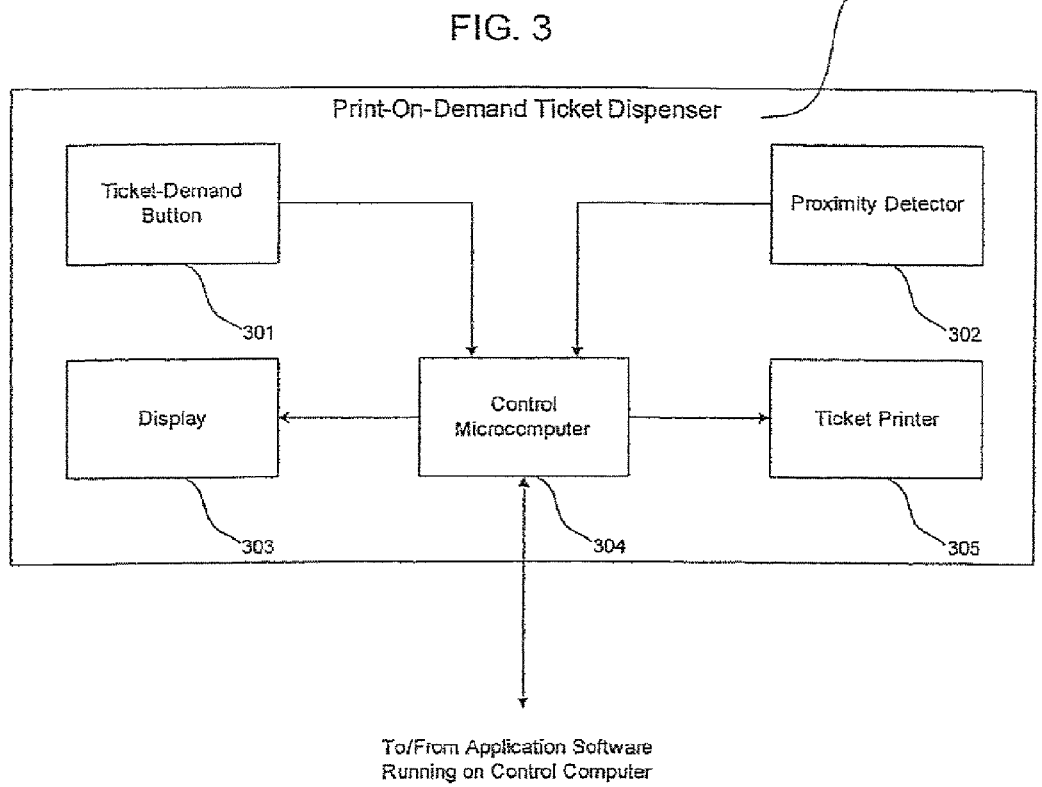

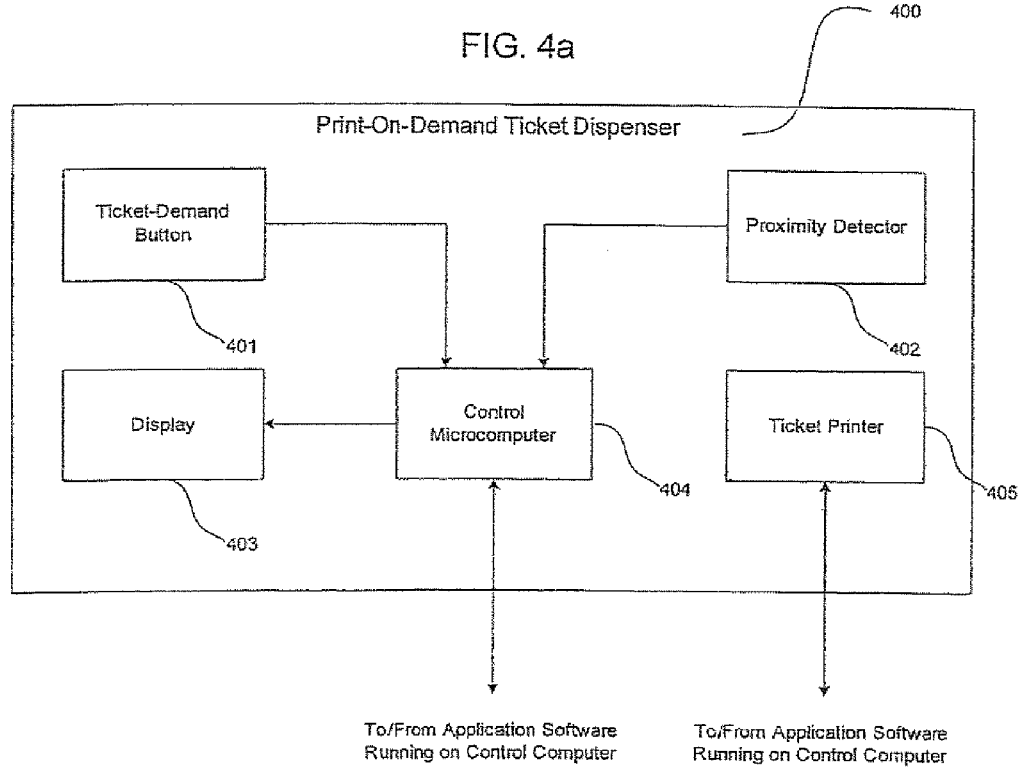

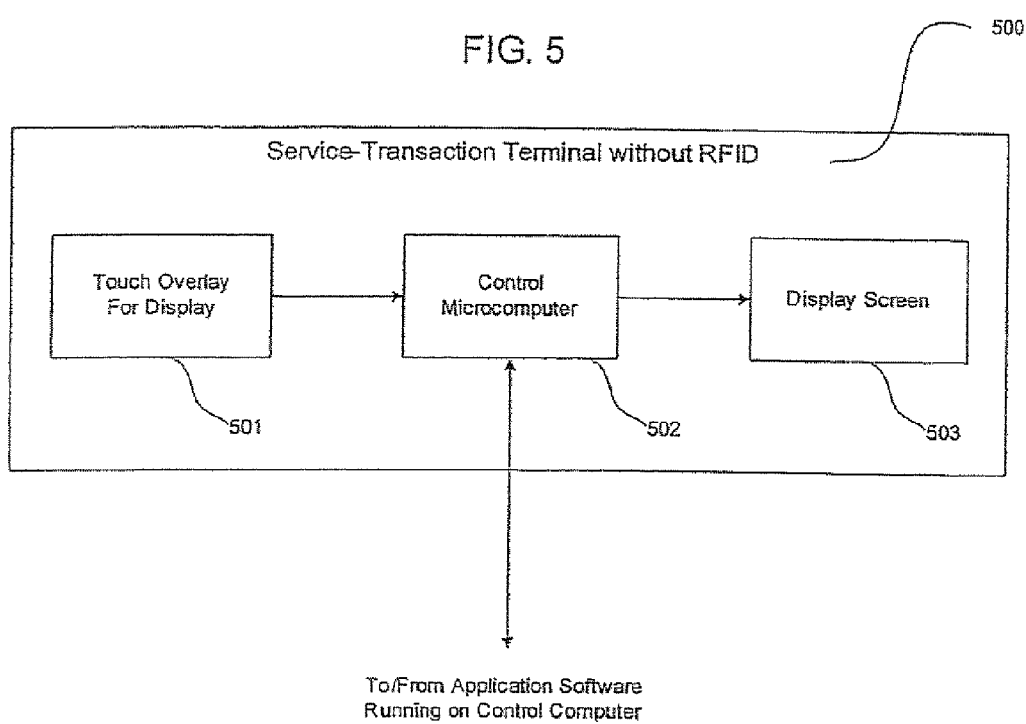

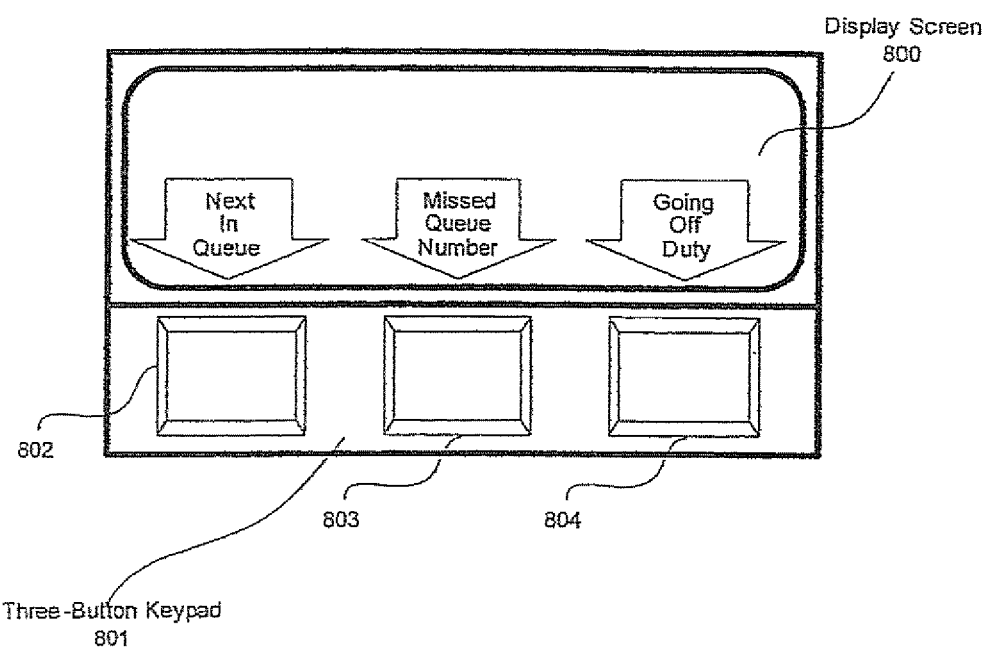

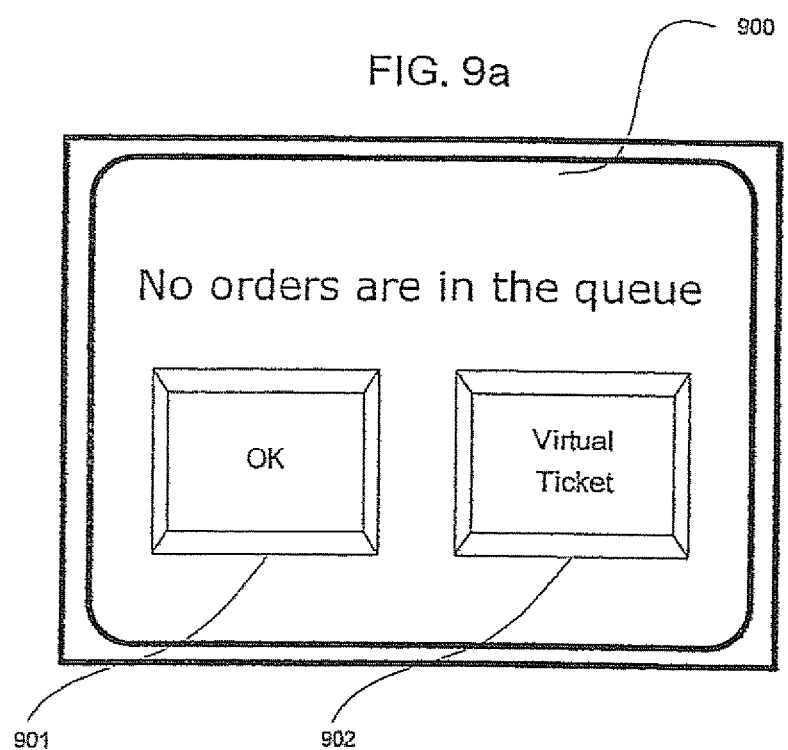

FIG. 10a

| Standard Fulfillment Minutes per Item | 2.1 |
|---|---|

| Day/Daypart | Standard # Items per Order |
|---|---|
| Weekend/All Hours | 3.2 |
| Weekday/Evening | 3.0 |
| Weekday/Non-Evening | 2.5 |

| Day/Daypart | Standard Fulfillment Minutes per Order |
|---|---|
| Weekend/All Hours | 6.7 |
| Weekday/Evening | 6.3 |
| Weekday/Non-Evening | 5.3 |

FIG. 10b

| Name of Service Person | Productivity Index |
|---|---|
| John | 1.1 |
| Mary | 1.0 |
| Fred | 0.9 |

FIG. 10c

| Queue Number | Ordering Channel | # of Items in Order | Standard Fulfillment Minutes |
|---|---|---|---|
| 55 | Counter | #NA | 6.3 |
| 56 | Kiosk | 4 | 8.4 |
| 57 | Counter | #NA | 6.3 |
| 58 | Kiosk | 3 | 6.3 |
| 59 | Kiosk | 5 | 10.5 |
| 60 | Counter | #NA | 6.3 |

FIG. 10d

|  | John | Mary | Fred |
|---|---|---|---|
| Current Clock Time | 5:32:00 PM | 5:32:00 PM | 5:32:00 PM |
| Predicted time free | 5:34:42 PM | 5:32:00 PM | 5:35:44 PM |
| Next queue number | 56 | 55 | 57 |
| Predicted fill minutes | 9.2 | 6.3 | 5.7 |
| Predicted time free | 5:43:56 PM | 5:38:18 PM | 5:41:24 PM |
| Next queue number | 60 | 58 | 59 |
| Predicted fill minutes | 6.9 | 6.3 | 9.5 |
| Predicted time free | 5:50:51 PM | 5:44:36 PM | 5:50:51 PM |

FIG. 10e

| Queue Number | Est. Order Start Time | Est. Order Completion Time | Est. Queue-Waiting Time | Est. Time to Completion |
|---|---|---|---|---|
| 55 | 5:32:00 PM | 5:38:18 PM | 0:00:00 | 0:06:18 |
| 56 | 5:34:42 PM | 5:43:56 PM | 0:02:42 | 0:11:56 |
| 57 | 5:35:44 PM | 5:41:24 PM | 0:03:44 | 0:09:24 |
| 58 | 5:38:18 PM | 5:44:36 PM | 0:06:18 | 0:12:36 |
| 59 | 5:41:24 PM | 5:50:51 PM | 0:09:24 | 0:18:51 |
| 60 | 5:43:56 PM | 5:50:51 PM | 0:11:56 | 0:18:51 |
| 61 (next) | 5:44:36 PM |  | 0:12:36 |  |

SYSTEM FOR QUEUE AND SERVICE MANAGEMENT

CROSS REFERENCE TO ELATED APPLICATIONS

This application is a continuation-in-part of U.S. patent application Ser. No. 11/607,283 filed Dec. 1, 2006, now U.S Pat. No. 7,752,146, which claims priority to U.S. provisional patent application Ser. No. 60/741,963, filed Dec. 2, 2005, both of which are incorporated by reference herein.

TECHNICAL FIELD

The present invention relates generally to service queue management and more specifically to service queue management and production management supporting real-time order fulfillment in a service operation wherein customers may place orders through a ticket dispenser as well as through other ordering channels.

BACKGROUND OF THE INVENTION

Queue management is a problem typically faced at grocery stores, such as with respect to fulfillment of deli orders. When a customer wishes to place an order for deli items, he/she typically must pull a ticket and remain in the vicinity of the counter until his/her number is called forward. Once the ticket number is called forward, the customer then approaches the counter to place his/her order. Once the order is placed, the customer must wait for the order to be fulfilled. This typically requires that the customer remain close to the deli counter in order to bow when the order is ready. The customer often has little understanding as to how long it will take for his/her ticket number to be called forward or how long will take the service person to fulfill his/her order. This uncertainty may be frustrating for the customer who may have other shopping to do at the store.

Most supermarkets with full-service deli departments use a manual 4"call-forward" queue-management system such as the "Turn-O-Matic" system sold by the Take-A-Number, Inc. Each customer pulls off a sequentially-numbered paper ticket from a preprinted roll in a dispenser to establish priority in a "first-come-first-served" service queue. Each ticket effectively represents a request for service by the service personnel to fulfill an order for goods, and service personnel satisfy these requests for service by "calling forward" each ticket number to be served in sequence, usually by verbally announcing the queue number and pushing a button to increment the "Now Serving" number on an overhead sign. The customer then answers the call and places the order with the service person, usually verbally, for immediate fulfillment.

More and more supermarkets are also offering customers the option of placing their deli orders through computerized ordering software via a computer, e.g. a "kiosk" computer. Each placement of an order through such computerized means is also a request for service, and the computer acts as an intermediary for the customer in actually placing the order with a service person for fulfillment, usually by printing the contents of the order on a printer behind the deli counter. In theory, the use of such computer-ordering systems should provide significant benefit by saving time, since the customers do not have to wait in line to place their orders, and also by being able to take as much time as they want to browse and order items. The retailer can benefit by reducing labor costs, since the service person does not have to take time to interact with the customer, and also by increasing sales. The increase in sales is due to several factors. Some customers will place their order through a computer who would otherwise not be willing, to wait in line. Customers are known to place larger orders through a computer than at the counter, primarily because they do not feel pressured by customers behind them in the queue to complete their order quickly and can take more time to browse and think of more items to buy.

However, managing customer-service levels using queue-management and customer-ordering systems as described above is complicated by several problems: lack of service-level performance information, especially in real time, and the fact that "counter customers" and "kiosk customers" create two separate and competing service queues. Further, other customers may place a call to the deli in order to place his/her order which creates an additional competing service queue, introducing a third competing service queue. These competing methods of placing orders and/or entering the queue create logistical problems for the employees fulfilling orders because, for example, an employee may begin fulfilling an order placed by phone and cannot provide the customer waiting at the counter with an accurate estimate as to how long it may be before his/her order is fulfilled. The result of these problems is reduced profits due to lost deli sales, higher operating costs, and diminished benefit from those computerized ordering systems.

Prior-art electronic call-forward queue-management systems, such as is described in U.S. Pat. No. 6,059,184 or those sold by market leader Q-Matic AB of Sweden, can provide a wealth of real-time service-level performance data. They can also provide another significant customer benefit by displaying an estimate of the queue-waiting time for a new customer joining the queue and allowing for management of multiple different service queues. However, all such prior-art systems support only one ordering channel for any given service queue and so can provide this information only for customers in that channel. In an environment with multiple ordering channels, this lack of visibility of the interaction between the various service queues becomes problematic. For example, measurement of order-fulfillment times and server-productivity, as well as estimates of queue-waiting times, will be significantly in error if the service personnel are filling orders from counter customers, kiosk customers and phone customers but the queue-management system that is performing the measurement only "knows" about the counter customers.

A much more severe problem not solved by the prior-art, single-channel queue-management systems is that of rationalizing and systematizing the service priority between the multiple channels. Since the same pool of service associates must satisfy service requests from counter customers, who are waiting in the ticketed call-forward service queue, from kiosk customers, whose orders have been printed by the deli printer, and from customers calling in orders via the phone, these parallel ordering channels create multiple separate queues that compete with each other for service. Without any systematic method of assigning relative priority of service between the service requests in the different queues, service personnel are forced to use their own best judgment in the allocation of their services. Especially during periods of peak demand, there will be a natural tendency for them to give priority to counter customers for several reasons. Counter customers are more visible, since they are standing right across the counter, whereas kiosk customers are present only in the form of paper coming out of the printer, and phone customers are also remote from the service personnel and the store itself. As queue-waiting times increase, counter customers may well become more vocal as well. Further, service personnel will likely rationalize that they can delay in filling orders from kiosk customers since those customers are shopping and do not need their orders filled as quickly and from phone customers who are not even at the store when their orders are placed.

This situation gives rise to a number of unfortunate consequences. Kiosk customers will all too often return to pick up their deli order at the conclusion of a shopping trip only to find that it has not yet been filled. Such customers will conclude correctly that they cannot rely on their kiosk order being filled and will frequently either revert back to waiting in the counter-service queue on future shopping trips or stop ordering from the deli altogether. In most cases in which the fulfillment of a deli order is so late that a customer is forced to leave the store without it, the order will have to be thrown away, resulting in waste of both the product and the labor cost of fulfillment. If a phone customer places an order and then comes to the store to pick up the order but it is not ready, he/she may not choose to order from the store again. Alternatively, the phone customer may determine that the counter-service queue is the only reliable ordering channel. On the other hand, counter customers may become offended when they see service personnel turning to fulfill orders from the printer or the phone instead of calling forward counter customers, thereby perceiving service to be unfair, perhaps even to the point of verbally criticizing the service staff for this perceived slight and/or discontinuing patronage of the deli (or even the store). The pressures of balancing service between multiple queues, using their own best judgement, places considerable stress on service personnel and degrades job satisfaction. One strategy of coping with this stress, often exhibited by the service personnel, is to sabotage the computerized ordering system in some way. For example, they may place a bag over the kiosk computer screen with "Out of Order" written on it, or disable the printer. Reducing the availability of the computerized ordering system reinforces the customers' perception that it is not a reliable ordering channel, further diminishing its benefits.

Accordingly, it is desirable to have a system that allows customers to be provided with an estimate as to how long it may take for his/her order to be fulfilled when customers enter the service queue through multiple channels. It also is desirable to have a system that manages the order priority for service personnel and that measures the productivity of service personnel fulfilling orders.

BRIEF SUMMARY OF THE INVENTION

It is an object of the present invention to provide a service-queue-management and production-management method and system. Another object of the present invention is to provide customers with estimated wait times for orders to be fulfilled when customers enter the service queue through multiple chapels. Further objects of the present invention provide systems and methods for customers to enter the service queue remotely through use of multiple channels, such as a ticket dispenser, a kiosk, a mobile device or a combination of systems, and wherein the multiple channels are organized into a single queue.

A method for integrating requests for service through multiple customer ordering channels into a single service queue to obtain goods or services from a provider in accordance with the invention includes enabling customers to request the service of fulfilling an order for goods or services from the provider that can be placed through a plurality of ordering channels, and arranging the service requests in a single queue based on the time at which each service request is placed regardless of the ordering channel used. The ordering channels may include direct counter service, the request for which is made through one or more ticket dispensers which dispense tickets having the next number in the service queue to waiting customers, and one or more computerized ordering systems which enable customers to simultaneously request service and place their orders for goods or services via a computer or other processing device, and combinations thereof.

A system for integrating requests for service through multiple customer ordering channels into a single service queue to obtain goods or services from a service location of a provider in accordance with the invention includes a control computer, one or more ticket dispensers each connected to the control computer and arranged to dispense tickets upon activation, and one or more computerized ordering systems each connected to the control computer and enabling placement of orders for goods or services using a computer or other processing device linked to the control computer. The control computer manages the service queue and more particularly, assigns the next number in the service queue to an order placed via a computerized ordering system or to a ticket dispensed from a ticket dispenser based on the time at which the ticket is dispensed from the ticket dispenser or the other is placed via the computerized ordering system.

Embodiments of the present invention are directed to a system for service queue management including a terminal controlled by the system having a processing platform to generate service queue information for a user, and a mechanism for the user to request or receive the service queue information. The processing platform preferably transmits promotions related to goods and services associated with the service queue information to a user. The mechanism for the user to request or receive service queue information may preferably include a mobile communications device or a manually-activated device located on the terminal. Service queue information may include a queue number, next queue number to be issued, estimated wait time for service, a predicted time of service, time of issuance of ticket, predicted queue-waiting time, marketing messages, instructions for use of said ticket dispenser, and average queue-waiting time.

Other embodiments of the present invention are directed to a system for delivering media based on user identification including a ticket dispenser controlled by the system for delivering media to a user, the ticket dispenser including at least one display, a control computer, and a mechanism for receiving identification information from a user. Upon receipt of the identification information, the control computer authenticates the user and transmits media tailored to the user for viewing by the user. The mechanism for receiving identification information from a user may preferably be arranged in connection with the ticket dispenser and include an optical card reader, a magnetic card reader, a biometric sensing device, a keypad, a touch screen, and a radio frequency identification (RFID) interface. In these embodiments, the user preferably views media tailored to the user on at least one display of the ticket dispenser. In other embodiments, the mechanism for receiving identification information is preferably an interface that communicates with a mobile device of the user, and in these embodiments, a user views media tailored to the user on his er mobile device.

Additional embodiments of the present invention are directed to a ticket dispenser including a housing, at least manually-activated device arranged on the housing, and a communications interface arranged in the housing for interfacing with a control computer controlling operation of the ticket dispenser. The control computer preferably generates queue and service related information for the ticket dispenser, and the control computer may be arranged in the housing of the ticket dispenser or it may be located remotely from the ticket dispenser. The ticket dispenser also may include a printer arranged in the housing for printing queue and service related information. The ticket dispenser also preferably includes at least one display arranged in connection with the housing for displaying queue and service related information.

A production-management method for monitoring individuals fulfilling orders for goods or services at a provider of such goods or services in accordance with the invention includes assigning each individual service person a unique identification, receiving requests for service to fulfill orders placed via multiple ordering channels, placing the service requests into a single queue based on the time at which each is placed or received by the provider regardless the ordering channel used, associating each service request with one of the uniquely identified individual service persons to fulfill that order, tacking the time spent by the individual service persons in fulfilling each order, and analyzing the performance of the service persons individually and as a group based on their order-fulfillment times.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 2 shows a block diagram of one embodiment of a print-on-demand ticket dispenser, one of the components of the present invention;

FIG. 3 shows a block diagram of a more complex embodiment of a print-on-demand ticket dispenser;

FIG. 4a shows a block diagram of a preferred embodiment of a print-on-demand ticket dispenser;

FIG. 4b shows a more specific implementation of the embodiment depicted in FIG. 4a;

FIG. 5 shows a block diagram of a non-RID embodiment of service transaction terminal;

FIG. 8 shows an example of what would preferably be displayed on the main screen of the transaction terminal depicted in FIG. 7;

FIG. 9a shows an example of what would preferably be displayed on the screen of the non-REID transactional terminal depicted in FIG. 5 when an associate attempts to execute a "next-in-queue" transaction when there are no orders in the service queue;

FIGS. 10a, 10b, 10c, 10d, and 10e illustrate examples of a predicted waiting time simulation according to the present invention.

DETAILED DESCRIPTION OF THE INVENTION

Figure 1:
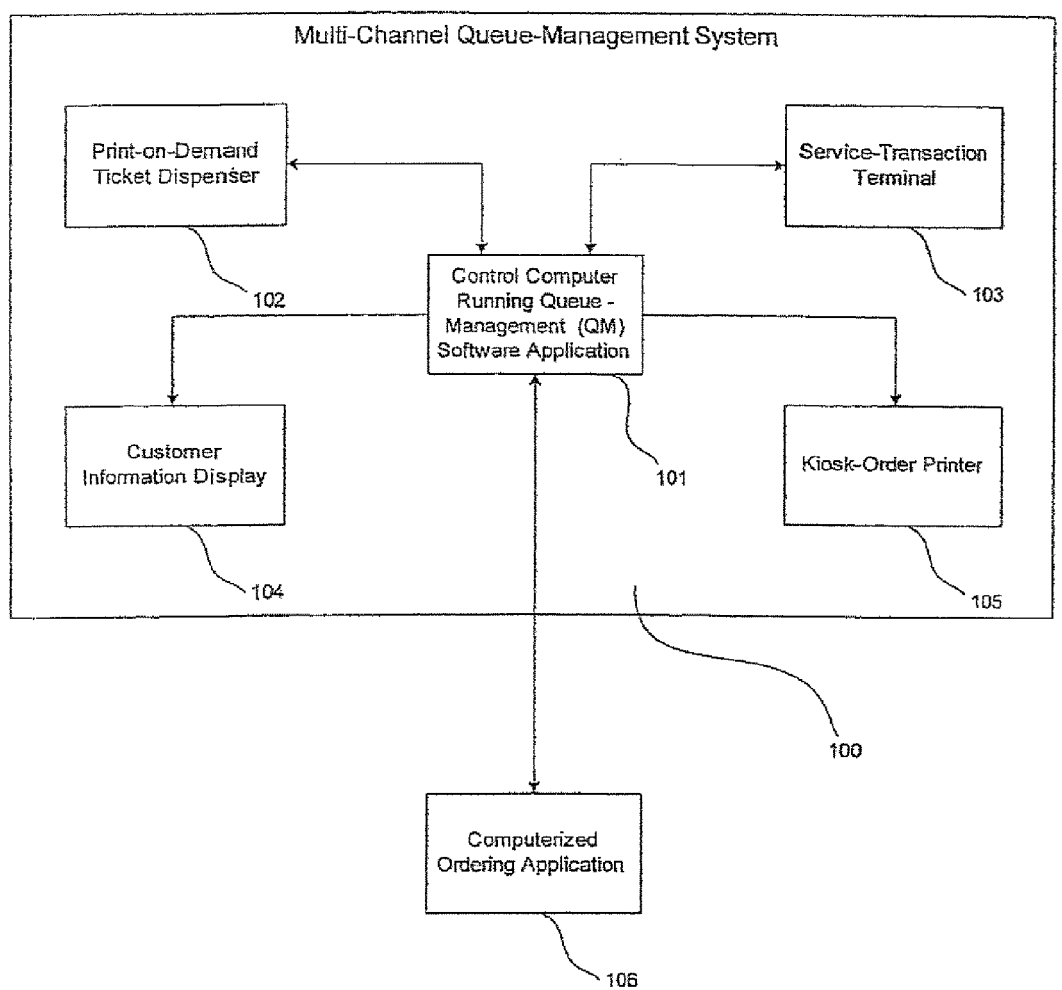
FIG. 1 shows a high-level block diagram of a functional components of the present invention, plus the presence of electronic ordering channel 106.

Referring to the accompanying drawings, an automated call-forward queue-management system in accordance with the present invention preferably (a) creates a single service queue for all customers regardless which ordering channel they use, e.g. whether they are placing an order at the counter or though a computer or mobile device, (b) measures service levels across all ordering channels, capturing all critical service-level parameters in real time, so that the retailer can more effectively and efficiently ensure the delivery of service to the satisfaction of customers, and (c) creates realistic service-level expectations for customers. By simultaneously performing these actions, the present invention increases sales, reduces costs, and maximizes the benefits from computerized ordering systems.

Sequential queue numbers preferably are assigned to all service requests by customers on a first-come-first-served basis, whether the customer wishes to order at the counter or through a computer or a mobile device. The standalone dispenser or preprinted queue tickets in the typical non-automated call-forward system is preferably replaced by a print-on-demand ticket dispenser. As in the current system, customers wishing to place an order at the counter request service by obtaining a queue ticket, but they do so by pressing a button on the dispenser rather than pulling a ticket off of a preprinted roll of tickets. When the button is pushed, a queue ticket is printed with the next number in its service queue. Customers placing orders through a kiosk or other computerized ordering system such as through a mobile device are also assigned queue numbers in the same first-come-first-served sequence. In other words, placing an order through the kiosk is an equivalent service request from a queue-management point of view as pressing the ticket-demand button on the ticket dispenser.

The system tracks the number of service personnel fulfilling orders at every moment, tracks which individual service person fulfills each order (though not necessarily by name), and captures the start and completion times—and therefore total fulfillment time—of each order. The system also preferably tracks the number of service requests in queue at each moment in time, and also measures the queue-waiting time of each order. It also captures the number of "abandoned" service requests, i.e. customers that take a ticket but do not actually answer the call to place an order.

By tracking the number of service associates in the order-fulfillment pool at any given time and estimating the expected fulfillment time for each order, the system is able to estimate with reasonable accuracy the queue-waiting time of the next customer to join the queue. Communicating this predicted waiting time to the customer eliminates the need for the customer to guess, creating instead a realistic expectation of queue-waiting time. Because all of this information is captured and tracked in real time, the system is able to send an alert to managers in the store when the predicted wait time exceeds a specified threshold, enabling them to react quickly by redeploying staff from elsewhere in the store to fulfill orders, thereby ensuring that acceptable customer-service levels are maintained.

A block diagram of a non-limiting embodiment of a system (100) of the present invention is depicted in FIG. 1. It comprises the following primary components: (a) a control computer running the Queue-Management (QM) software application (101), with a communications interface to all of the system peripherals plus an interface to one or more computerized-ordering software applications (106) such as those that interact with customers placing a kiosk order; (b) one or more print-on-demand ticket dispensers (102), typically located in the customer area near the service counter (c) one or more service-transaction terminals (103) distributed in the order-fulfillment work area behind the service counter; (d) one or more order printers (105) also distributed in the order-fulfillment work area behind the service counter; and (e) one or more customer-information displays (104), typically mounted overhead within the service-counter area for easy view by waiting or prospective customers. Each of these system components is addressed in further detail below.

The QM Application (101) software is the heart of the queue-management system. It performs several key functions, including but not limited to, controlling the operation of the peripheral components of the system, including the ticket dispenser(s) (102), service-transaction terminal(s) (103), the customer-information display(s) (104), and the order printer(s) (105); communicating with computerized ordering software applications (106) so that service requests from various ordering channels can be integrated into a single service queue; predicting queue-waiting times for each customer in the service queue; generating a variety of service-level and productivity reports to managers, providing detailed visibility into service operations; and alerting managers when exception conditions occur, such as unacceptably long predicted queue-waiting times.

The ticket dispenser (102) replaces the traditional "take a paper ticket" dispenser typically found in front of the deli. It preferably includes, at minimum, a manually-activated button and a ticket printer in a single housing. Wen the user activates the button (as described further below), a known character sequence is preferably transmitted out an Ethernet port on the ticket dispenser. The QM Application (101) is connected to this port and it reserves/returns the next queue number in sequence. This queue number, along with an estimated wait time and optional marketing/offering messages is formatted into a print stream and preferably sent via Ethernet to the ticket printer of the ticket dispenser.

Referring now to FIG. 2, ticket dispenser (200) is used to reserve a position in the queue by customers wishing to place an order at the counter. The customer obtains a queue ticket by activating a button (201), which causes the QM Application (101) to dispense a ticket for the customer preferably on a printer (202). The customer removes the ticket from the printer (202), holds it until the queue number printed on the ticket is called forward for service, presents the ticket to the service person to validate service priority, and places the order directly with the service person.

Ticket dispenser (200) can have a variety of configurations, such as those depicted in FIGS. 2-4. In a simple embodiment (FIG. 2), it includes the button (201) that, when pressed by a customer wishing a ticket, inputs a signal to the QM Application (101) running on the control computer, and a ticket printer (202) that receives and prints information from the QM Application (101). In a more complex embodiment shown in FIG. 3, ticket dispenser (300) is itself a subsystem including a control microcomputer (304) that communicates with the QM Application (101) and controls a set of its own peripherals One of these peripherals is the same demand button (301) shown in FIG. 2, which is pressed by a customer desiring a ticket, but in this configuration, inputs its signal to the control microcomputer (304) rather than directly to the QM Application (101). Similarly, another peripheral within the ticket-dispenser (300) subsystem is the ticket printer (305), which also in his configuration may be preferably directly controlled by the control microcomputer (304) rather than the QM Application (101).

Additional peripherals show in FIG. 3 but not show in FIG. 2 are a proximity detector (302) and a display screen (303). The display screen (303) shows, at a minimum, the next queue number to be issued and the predicted queue-waiting time for that queue number, and can also display marketing messages, instructions, etc. The proximity detector (302) is preferably a standard sensor that works by emitting some form of radiated energy (such as infrared light or ultrasonic sound) and detecting the reflection of that energy off the body of a person standing directly in front of the ticket dispenser (300). The purpose of this combination of peripherals is preferably to measure the number of customers who approach the ticket dispenser (300) (as determined by the proximity detector (302)) without requesting a ticket. Such a sequence of events would be consistent with a customer considering taking a ticket for counter service, but then deciding not to do so, because of dissatisfaction with the predicted queue-waiting time show on the display screen. This information would allow for relatively precise determination of a maximum allowable predicted-wait-time threshold that results in an economically optimal service level.

The embodiment shown in FIG. 4a is an embodiment that preferably combines features of both embodiments shown in FIG. 2 and FIG. 3. As in FIG. 3, there is a control microcomputer (404) that controls certain peripherals (button (401), display (403), proximity detector (402)) and communicates with the QM Application (101), but it does not control the ticket printer (405), which has its own direct communications link to the QM Application (100), as in FIG. 2. The button (401), proximity detector (402), display (403), control microcomputer (404) and ticket printer (405) can be situated in a common housing. An advantage of this embodiment is that the control microcomputer (404) in FIG. 4a can be a much simpler, lower-cost component than the one in FIG. 3 precisely because it does not have to run complex print-driver software.

Figure 4B:
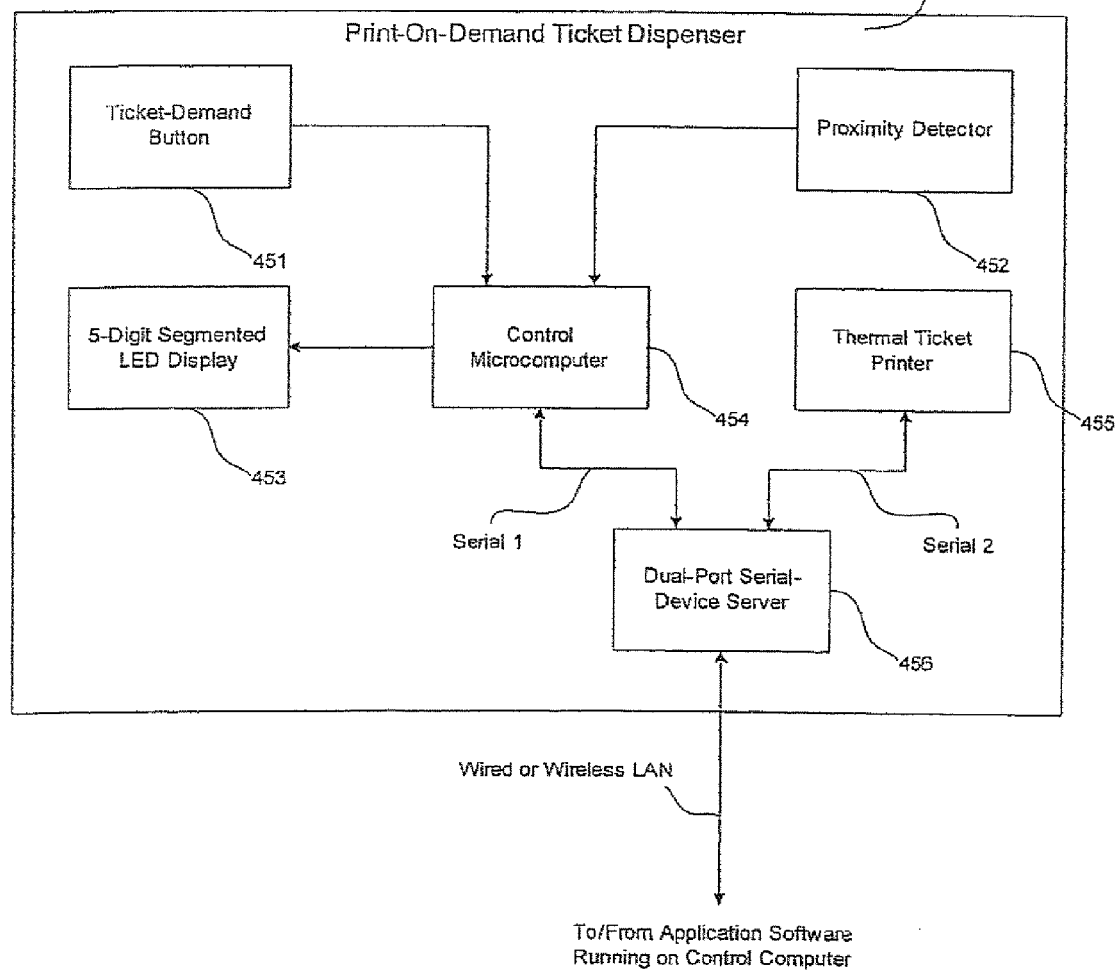

A more specific implementation of this embodiment is shown in FIG. 4b, in which the control microcomputer (454) is a very simple, low-cost single-chip microcontroller such as the Atmel AT89C51RD2, running no operating system. The display preferably includes five segmented numeric LED display (453), three digits for queue-position number and two digits for predicted wait time, although it should be appreciated that more or fewer numbers may be displayed depending on the needs of the store. The ticket printer (455) in this embodiment preferably is one that uses thermal printing technology, such as the Swecoin TTP2010. The separate communication channels between the QM Application (101) and both the control microcomputer (454) and the printer (455) are accomplished through a dual-port device server (456) such as the Lantronix WiPort. The Lantronix WiPort is a device server that converts serial devices to network devices. It converts network data (TCP/IP and UDP) to raw serial data. This module essentially converts serial message packets to local-area network (LAN) message packets and LAN packet to serial message packets, and can support two separate serial devices through two serial ports. In this embodiment, the control microcomputer (454) preferably communicates via one of the two serial ports and the printer (455) via the other serial port, so that each effectively has its own connection to the QM Application (101) over the network. The control microcomputer (454) can thus receive an input from either the button (451) or proximity detector (452) and transmit either a ticket-print request or a customer-detection event to the QM Application (101), respectively, and can also receive data to display on the segmented LED numeric display (453). The QM Application (101) can also drive the thermal ticket printer (455) directly through the network connection and device server (456). The button (451), proximity detector (452), display (453), control microcomputer (454), ticket printer (455) and server (456) can be situated in a common housing.

When the customer approaches the ticket dispenser, the ticket dispenser display preferably shows the last ticket number and the average wait time as of the last time that a ticket was requested. As discussed above, referring back to FIG. 2, a customer preferably obtains a queue ticket by pressing a button (201), which causes the QM Application (101) to print a ticket for the customer on a printer (202). The customer activates the button (201), and the dispenser communicates with the server to obtain the next queue number. The ticket preferably includes at minimum a queue number and an estimated wait time.

While FIGS. 2-4 depict a ticket dispenser having a single ticket-demand button, it should be appreciated that other selection mechanisms or additional buttons may be incorporated as part of the ticket dispenser without departing from the objects of the present invention. For example, in place of or in addition to a button, the ticket dispenser can preferably include any other type of device which is manually activated by a customer to indicate an intent to place an order by requesting and receiving a ticket with the next number in the queue. In other embodiments of the present invention, the ticket dispenser (200) preferably includes a keypad wherein the customer may type in certain information in order to identify himself/herself (i.e., email address, mobile device number). This information entered may preferably be associated with the customer's loyalty or reward card for the retail store and may permit the customer to gain certain additional benefits from use of the ticket dispenser as will be described in more detail below.

In an embodiment of the present invention, the ticket dispenser preferably includes buttons that incorporate designations depending on the tye of service requested (i.e., bakery, deli, pre-prepared foods, sushi). For example, a customer may approach the ticket dispenser, determine that he/she would like to request services from the bakery, and press the button designated as bakery. The bakery button may include the word "bakery" or another similar word, a picture of a bakery-related item, or another icon that a customer would be likely to associate with bakery services. In another embodiment of the invention, the buttons are preferably shaped in a manner that would typically be associated with the particular service being requested. For example, the button may be configured in the shape of a cake to designate bakery services or the button may be in the shape of a fish to designate seafood services.

When the customer presses the button associated with bakery services, the ticket dispenser preferably causes the QM application (101) to print a ticket for the customer including at least the estimated wait time and queue number specifically related to fulfillment of a request for bakery services. If that same customer also were to require deli services during the same visit to the store, he/she may then preferably press the button associated with deli services. A ticket would then be printed including at least the estimated wait time and queue number specifically associated with the request for deli services. Accordingly, the customer would be called forward at both the bakery and the deli when the respective queue numbers are called. By segmenting the ticket dispenser to dispense a separate ticket associated with each service requested, the customer preferably is able to better predict the order in which he/she may be served by the different departments of the store.

In a further embodiment of the present invention, when the ticket dispenser includes different buttons to designate different services to be requested, the ticket dispenser also may preferably include separate display screens associated with each of the services that may be requested. Accordingly, a customer would preferably approach the ticket dispenser and be able to determine how long the estimated wait time is for bakery services by viewing the display screen associated with the bakery button on the ticket dispenser. In an alternative embodiment of the present invention, the ticket dispenser preferably includes a single display screen that is configurable by the user, such that the user can selectively switch the display screen to view the estimated queue wait time for a given service. As such, if the user is interested in determining how long the estimated wait time for bakery services may be, he/she can switch the display screen to view service date (e.g., current queue number being served or estimated wait time) related to bakery services. The screen switching process may be performed in several manners, such as through turn of a knob, use of buttons above or below the screen that allow the customer to punch a button and select the desired display, use of a touch screen, a keypad or other mechanism that allows for selection of a display.

In an embodiment of the present invention, the ticket dispenser may preferably include a scanner or other card reading capabilities wherein a customer could scan his/her loyalty or reward card associated with the store in which he/she is shopping. In this embodiment, the ticket dispenser preferably prompts the customer for his/her ID (such as mobile number, email address, or text message identification). The customer's loyalty or reward card is linked to the ID, and the customer's loyalty or reward card information may be displayed on the display of the ticket dispenser. In another embodiment, a customer may scan a barcode associated with his/her mobile device so as to allow the ticket dispenser to access the customer's loyalty or reward card information, as described for example in commonly assigned U.S. patent application Ser. No. 10/646,579 which is incorporated by reference. These embodiments preferably allow the store to identify the customer in order to offer any services afforded to loyal customers of the store (i.e., discounts, offers) as described below.

The process of scanning the customer's loyalty or reward card or accessing the customer's mobile device containing the loyalty or reward card information may preferably act as a trigger to initiate printing of a ticket by the ticket dispenser. In an embodiment of the present invention, when the customer's loyalty or reward card is scanned at the ticket dispenser, the scan preferably determines the customer's purchasing history, for example with respect to the deli or bakery. By assessing the customer's purchasing history, a coupon, offer or some other incentive (i.e., the customer will receive one pound of cheese for no charge if he/she places an order for a certain meat that the store is advertising) may be distributed when a ticket is printed by the ticket dispenser. The coupon or other incentive may be printed on the same ticket that contains the queue number and estimated wait time. In another embodiment of the present invention, an additional ticket displaying the coupon or other incentive may be printed out either before or after the ticket containing the queue number and estimated wait time is dispensed. Other embodiments of the invention preferably provide that the coupon or other incentive is pushed out to the customer's mobile device such that the customer does not receive a hard copy of the coupon or incentive, as described in commonly assigned U.S. patent application Ser. Nos. 10/877,093 and 10/691,459, which are incorporated by reference.

As previously described, the ticket dispenser preferably dispenses a printed ticket identifying the queue number and estimated wait time for the service being requested. However, other embodiments of the invention provide that the customer preferably activates a button on the ticket dispenser associated with the service being requested. After the button has been selected, the QM application preferably sends a message to the customer's mobile device providing that customer with the information that would have been typically provided on the printed ticket. Alternatively, the customer may not have to select a button on the ticket dispenser, electing instead to communicate with the ticket dispenser by, for example, tapping his/her RFID mobile device, by sending and receiving text messages with the ticket dispenser, or by the ticket dispenser prompting the customer for his/her ID (such as a mobile phone number, email address, text messaging identification). In each of these embodiments, the customer preferably is provided with his/her queue number on the mobile device. This has the advantage of providing the customer with the required information in order to enter the queue and also reduces waste caused by the printing of tickets.

Other embodiments may provide that the customer preferably can access the QM Application remotely using his/her mobile device in order to gain updates as to the estimated wait time and/or the queue number currently being served. In this embodiment, the user possesses real-time information about the queue status, enabling the customer to more efficiently shop in the store.

In another embodiment, the customer has an REID tag associated with the store. The RFID tag may be placed, for example, on the customer's bag, on a card that the customer carries, or a fob for attaching to the customer's keychain. When the customer approaches the ticket dispenser, the customer's REID tag communicates with the ticket dispenser in order to display information relevant to the customer and to activate the ticket dispenser (described below).

When a customer utilizes his/her mobile device at the ticket dispenser in order to obtain a queue number and/or estimated wait time, as previously discussed, the system may push out alerts to the customer's mobile device to notify the customer, for example, that the estimated wait time has increased or decreased or that other coupons or offers are available. Other embodiments preferably include notifying the customer that the wait time for a non-selected service may be desirable. Further, an alert may be sent to inform the customer when his/her queue number has been called forward.

As an example, a customer preferably utilizes the ticket dispenser to enter the queue for deli services. The customer receives his/her queue number and estimated wait time for obtaining deli services via his/her mobile device. While at the ticket dispenser, the customer may have considered entering the queue for bakery services but elected not to do so because the wait time was longer than desirable. The ticket dispenser may preferably determine using, for example, an embodiment of proximity detector (402) described above, that the customer viewed the display screen associated with bakery services but elected not to enter the queue. If the circumstances associated with bakery services then change (i.e., the estimated wait time becomes shorter because the orders being fulfilled are smaller on average), the system could preferably notify the customer of such change via the customer's mobile device. The customer may then opt to enter the queue for bakery services by selecting an option provided on his/her mobile device. Alternative embodiments provide that the customer may not utilize his/her mobile device to enter the bakery service queue but instead may return to the ticket dispenser to enter the bakery queue upon receiving such alerts as to changes in the estimated wait time.

In another embodiment of the present invention, offers preferably may be displayed on a display screen of the ticket dispenser. While offers may not necessarily be associated with a particular customer's shopping behavior, offers typically are used to predict and analyze customers' behavior. An offer may be generally distributed to promote a certain type of product, for example, a selected deli meat, and all customers utilizing the ticket dispenser would then have an opportunity to accept that offer. If a customer elects to communicate with the ticket dispenser utilizing his/her mobile device or his/her REID tag, upon making contact with the ticket dispenser, the ticket dispenser preferably may display advertisements or offers associated with the customer.

Acceptance of an offer may be indicated by pressing a certain button on the ticket dispenser associated with offer acceptance; however, preferably the customer accepts the offer by electing to utilize the ticket dispenser to enter the queue for obtaining services. Accordingly, the offer may then be printed on the ticket that indicates the queue number and estimated wait time. In a further embodiment of the present invention, the customer may indicate acceptance of the offer by selecting the button to request a ticket to enter the queue for certain services when the customer selects the button, a signal is sent to the one or more service-transaction terminals distributed in the order-fulfillment work area behind the service counter. At the time when the customer's queue number appears on the service-transaction terminal indicating that he/she is the next to be served, the service worker would be notified that the customer has accepted the offer when utilizing the ticket dispenser. Accordingly, the offer would be applied to the customer's order at the time when the order is placed with the service person. The customer also preferably may be reminded of his/her acceptance of the offer on his/her mobile device. Other embodiments provide that if the customer has associated his/her loyalty or reward card with the order to be placed, then upon acceptance, the offer would preferably be associated with the customer's loyalty or reward card and later applied to the customer's order upon check-out at the store.

In an additional embodiment, a customer utilizes his/her RFID tag to communicate with the ticket dispenser. When the customer nears the ticket dispenser, the ticket dispenser preferably recognizes the customer and displays advertisements or offers that are pertinent to that customer. Other embodiments provide that the ticket dispenser recognizes the customer and displays the customer's prior transactions in order to guide the customer's future purchases. For example, the customer frequents the store, and in the past three trips, the customer purchased certain types of cheese and meat from the deli. when the customer approaches the ticket dispenser and identifies himself/herself to the ticket dispenser, the ticket dispenser displays the prior purchases of meat and cheese in order to remind the customer of what he/she prefers to purchase at the deli. Additionally, the ticket dispenser may display information about complementary or related products that the customer might elect to purchase. This might include a special type of bread that goes well with the meat or a similar type of meat being offered at a discounted price.

Other embodiments of the present invention include incorporating live video and/or multimedia displays into the ticket dispenser. The live video and/or multimedia display may preferably include sound that may describe products being featured or advertisement information associated with what is being displayed. Additional or alternative embodiments include incorporating color into the display screens of the ticket dispenser. Color preferably allows images of products to be displayed in a manner that more accurately reflects what the customer expects to receive if he/she purchases the product.

Turning to the service side of the system, the QM Application (101) preferably interacts with service personnel by means of one or more service-transaction terminals located in the work area behind the service counter. These terminals allow service personnel to call forward orders for service, associate a specific service person with each order, and capture the start and completion times (and hence fulfillment time) of each order.

For the service-transaction terminals to be as effective as possible, the QM Application (101) must reliably estimate queue waiting times. In order for the QM Application (101) to reliably estimate queue-waiting times for customers considering joining the queue, it must know precisely how many people are in the pool of service personnel filling orders. In typical prior-art electronic call-forward queue-management systems, a separate transaction terminal, each with a unique internal identifier, is dedicated to each server, so that the number of different transaction terminals interacting with the application software provides the number of service personnel. This methodology works in an environment in which the service personnel remain at a stationary point of service, e.g. a bank teller, but is not practical in a more dynamic environment in which the service personnel move around the work area fluidly, as is the case in a full-service deli. To solve this problem, the present invention includes the step of uniquely identifying the service person with each transactional input from a service-transaction terminal (103), so that any service person can use any one of multiple such terminals (103) for any transaction.

There are at least two modes of uniquely identifying servers: named identification (e.g. "John Jones", "Mary Smith", etc.) and anonymous identification (e.g. "Server 1", "Server 2", etc.). Named identification has the advantage of enabling managers to measure and track the productivity of each worker for purposes such as performance evaluation, compensation, and training, but anonymous identification adequately enables the QM Application (101) to flack how many people are in the server pool at any given time for the purpose of estimating queue-waiting times.

At least two embodiments of the service-transaction terminal (103) are envisioned, which use different methods to identify the service person with each transaction. These embodiments are described below.

Figure 6:
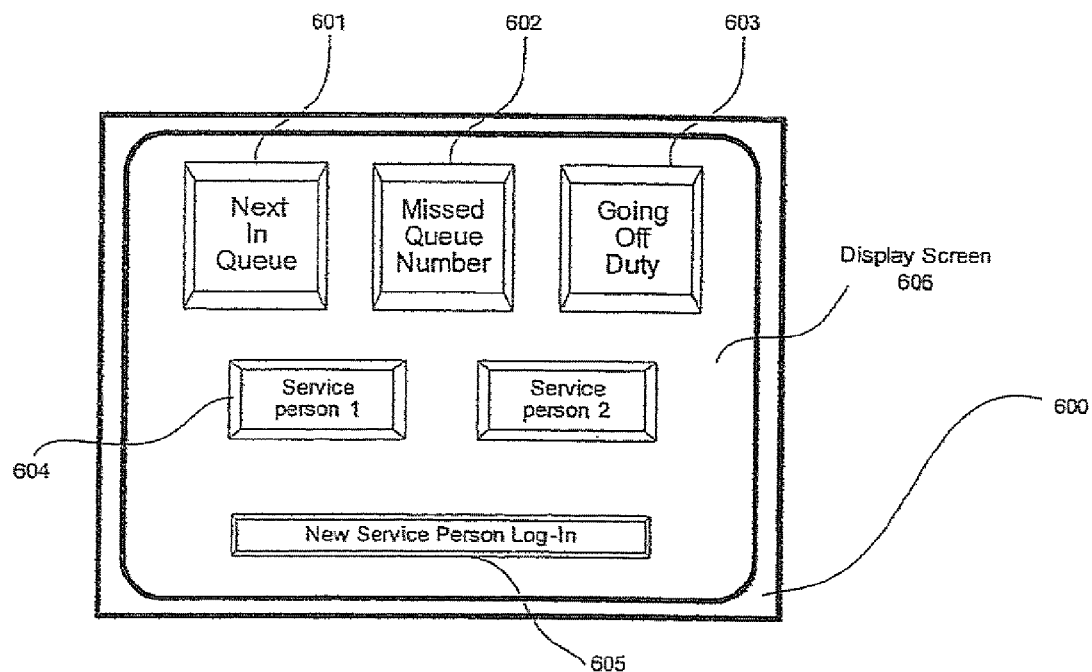
FIG. 6 shows an example of what would preferably be displayed on the main screen of the transaction terminal depicted in FIG. 5.

An embodiment shown in FIG. 5 includes a control microcomputer (502) with a display (503) and touch-sensitive screen overlay (501), a combination commonly known as a touch-screen (500). With this embodiment, service personnel use the touch-screen interface to log into and out of the server pool and to identify themselves with each transaction. As depicted in FIG. 6, the "Main Screen" (600) displayed on the terminal (500) will preferably include several graphical action objects. The terminal may preferably include an identification object (604) assigned to each service person logged into the system, with either the person's name (named-ID mode) or with some anonymous form of graphical differentiation (anonymous-ID mode). These objects (604) are used to identify the server conducting each transaction. Except for New-Server-Login (605), all transactions require the service person to first touch his/her individual ID object (604), and then one of three service transaction buttons.

A "New-Server-Login" button (605) object is preferably used by service personnel to join the active server pool. A service person entering the pool touches this button (605), whereupon the QM Application (101) displays either a set of named identification objects for all service personnel registered to use the system (named-ID mode), or set of anonymous ID objects (anonymous-ID mode). The service person selects the ID object to be used to identify him/her when conducting transactions. Several service-transaction buttons are preferably included. The "Next-In-Queue" button (601) is preferably used to call forward the next customer in the service queue. The "Missed-Queue-Number" button (602) is preferably used to serve a customer who missed the call forward of his/her queue number when originally announced but has returned to place an order. The "Going Off Duty" (603) button is preferably used to take a service person out of the active server pool.

Figure 7:
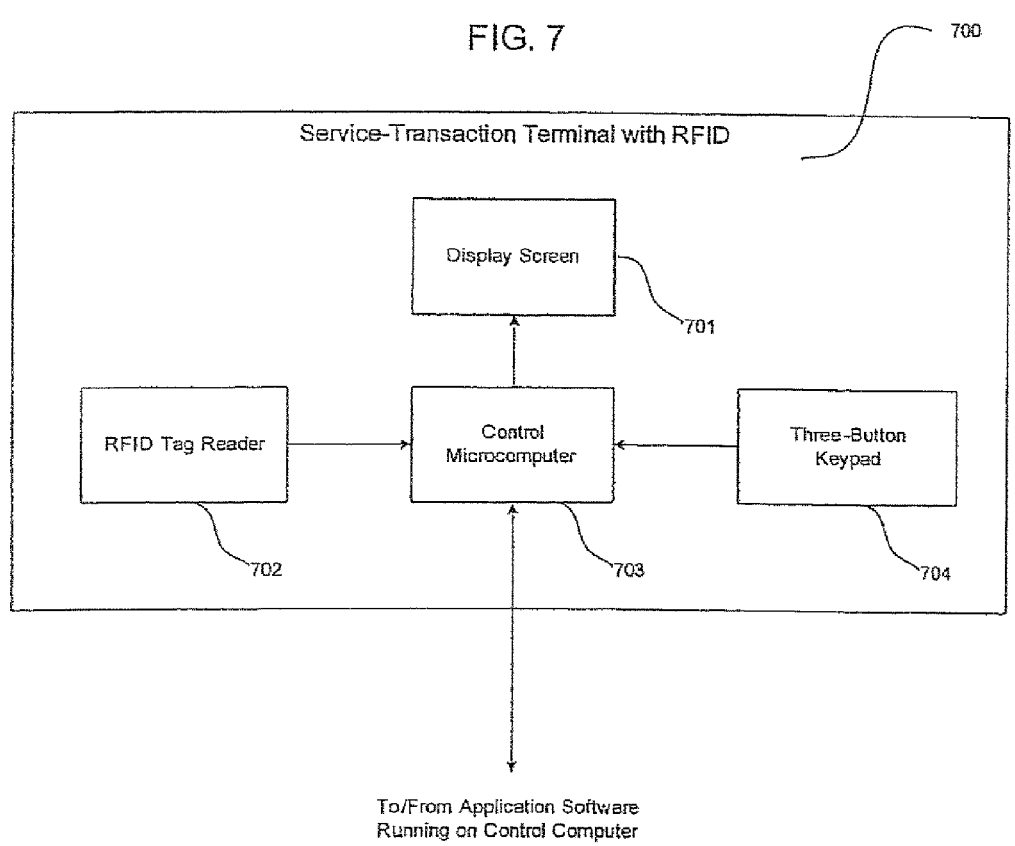
FIG. 7 shows a block diagram of an REID-enabled embodiment of service transaction terminal.

An alternative embodiment of the service-transaction terminal (700), depicted in FIG. 7, uses radio frequency identification (REID) as a mechanism for identifying service personnel, and requires that a service person be wearing an REID tag in order to interact with the terminal (700). This is a preferred embodiment of the transaction terminal (700) primarily because it simplifies the process whereby the service personnel interact with the system, since the identification step is transparent to the user. The REID tag worn by the service personnel is preferably a bracelet, which is easily detachable and which can be read at very short range during an interaction, but the tag could alternatively be embedded in a name tag or even within the fabric of a jacket or apron (especially at the end of a sleeve, which would be an equivalent location to the bracelet). The named mode of identification would require that a specific unique RID tag be assigned to each individual service person and only worn by that person. In the anonymous mode of identification, by contrast, there could be a common set of RFID tags, any one of which could be worn at any given time by any service person, enabling the system to know the number of different service personnel fulfilling orders, and track each one individually, without knowing the named identity of any of those people.

As depicted in FIG. 7, the RFID-enabled embodiment of the service-transaction terminal (700) includes a control microcomputer (703), a display screen (701), a multi-button keypad (704), and an REID-tag reader (702). While it would certainly be possible to use a touch-screen (500) for input, as in the alternative embodiment shown in FIG. 5 and discussed above, the multi-button keypad (704) is typically a more reliable and less expensive input means. One type of REID reader is commonly referred to as an interrogator.

An advantageous approach to the design of a user-interface is the use of "soft buttons," whereby the function of each button changes depending on the context and content of the display screen (701). FIG. 8 shows such an approach for the "Main Screen" functionality similar to that described above, except that rather than touching the touch screen (606) over a viral button object displayed on the screen (701), the service person touches the button on the multi-button keypad (802) (e.g., the left-most button in FIG. 8) based on functional labels for the buttons shown on the display screen (800). Another important difference between the two illustrative embodiments shown in FIGS. 5 and 7 is that in FIG. 8 there is no service-person ID object (604), nor any "New Service-Person Log-In" button (605). Identification of the service person is accomplished by reading the identity of the REID tag worn by the service person by means of the RFID-iag reader (702), for example as the bracelet comes into range of the reader when the hand nears the buttons on the keypad (704). Similarly, the log-in of a new service person occurs automatically upon the detection of a new REID tag not already active in the server pool. It should be appreciated that in place of REID tags, other types of tags which generate a signal upon being energized or activated by a transmission signal can be used without departing from the objects of the present invention.

Referring back to FIG. 1, orders placed through a computerized ordering channel (106) are printed out on the order printer (105) located in the order-fulfillment work area behind the counter, just as they are in the conventional set-up today except that, instead of being printed by the ordering application (106) immediately submission by customers, orders are printed under the control of the QM Application (101) when their associated queue numbers are called forward for service.

The customer information display (104) comprises a large display screen and optionally one or more audio speakers mounted, for example, to the ceiling above a central location of the service counter. Its purpose is preferably to provide service-queue information to customers whenever the service department is open for business. At a minimum, this information would include the "Now Serving" number, i.e., the queue position currently being served, as is shown on typical manual call-forward queue-management systems today, and could advantageously show the ordering channel (counter or kiosk) of the order currently being served. The primary purpose of displaying the ordering-channel information is to explain to waiting counter customers why not customers are called forward when a kiosk order is filled. In addition, if not displayed on the ticket dispenser (102), the customer information display (104) could show the next queue-position number ("Next Ticket" number) to be issued (the difference between the "Next Ticket" and "Now Serving" numbers being the number of customers already waiting in the service queue), and the predicted wait time for that next queue position. This information is updated automatically by the QM Application (101) as required, as will be described more below.

Each time a new order is called forward for service, the "Now Serving" number is incremented to display that number. If this new order being served is from a counter customer, audible computer-generated voice announcement is emitted via the audio speaker(s) to call the customer forward if the customer information display (104) is equipped with speakers; otherwise the service person verbally calls out that queue-position number.

If the service counter is closed, the customer information display (104) shows a message to that effect and preferably an advisory as to what the business hours are. In another embodiments, multiple customer information displays (104) can be provided, and if so, would preferably be situated at different locations in and around the service area or store.

In another embodiment, the customer information display (104) also could optionally show marketing messages, including advertising. If a particular item is being featured, images of the item may be displayed on the customer information display (104). Additionally or alternatively, information about an offer associated with a particular product may be displayed. For example, the display may include a message such as "$1 off store-brand X meat with purchase of store-brand X cheese." Accordingly, when the customer is viewing the customer information display (104) to remain updated as to his/her position in the queue, he/she also may be influenced by the offers being displayed. Further, when a customer approaches die counter to place an order, he/she may view tle offers or marketing messages on the customer information display (104) and add items to his/her order based on the offers.

A core function of the QM Application (101) is to place customers into a service queue by issuing sequential queue-position numbers. Service-queue numbers preferably are issued to counter customers through the ticket dispenser (102) and to kiosk customers through an interface to the ordering application software (106).

As described above, a customer may obtain a queue ticket by activating a button on the print-on-demand ticket dispenser (102) and/or by communicating with the ticket dispenser using his/her mobile device or RFID tag, causing the QM Application (101) to print a ticket on the dispenser's printer (202). At a minimum, the information printed on the ticket will preferably include a humanly-readable representation of the queue-position number assigned to the customer. The printed ticket could optionally also include a time-stamp showing the time the ticket was issued, the predicted queue-waiting time, the predicted time of service (time-of-issue plus queue-waiting time), a machine-readable (e.g. bar coded) representation of the queue-position number, and various types of marketing messages (advertising, discount offers, etc.).

The kiosk utilized by kiosk customers preferably includes several hardware peripherals. A scanner or other magnetic strip reader permits a customer to scan or swipe his/her loyalty card to activate favorite features. A motion sensor is preferably used to turn the scanner on when a customer approaches. It should be appreciated that some kiosks may preferably perform this action automatically. A printer is preferably used to print a customer receipt when the order is placed.

The QM Application (101) issues queue numbers to kiosk customers through an application program interface (API) with the electronic-ordering application (106) software. This API includes several key elements of functionality. The ordering application (106) can establish communication with the QM Application (100). Accordingly, the ordering application (106) allows customers to place orders using the kiosk. The ordering application (106) preferably communicates with the QM Application (101) to request and receive information about the current predicted queue-waiting time and predicted order-fulfillment time of the next order to be placed or any order already placed. Accordingly, the ordering application (106) informs customers when they can expect their orders to be ready. In another embodiment, a customer may elect to use the kiosk to reserve a position in the service queue. In a preferred embodiment of the invention, this occurs when the customer commits/submits an order and the ordering application (106) communicates with the QM Application (101) to reserve the customer's service queue position.

As previously addressed, the ordering application (106) preferably reserves the customer's queue position when he/she commits/submits an order for services. However, it should be appreciated that in other embodiments, the customer's queue position may be reserved at the time when the customer begins entering his/her order at the kiosk. In this situation, the customer may not always complete and submit his/her order before his/her queue number is called forward for service. As such, the information about the order already entered at the kiosk may be submitted directly to service personnel for fulfillment. At a minimum, the contents of the order are preferably a print image or character string, the use of which by the QM Application (101) is to send to the deli printer (105) as described more fully below. Alternatively, the kiosk customer may be converted to a ticket dispenser customer, and the customer can place his/her order at the counter in the same manner as a ticket dispenser customer.

The ordering application (106) can also advantageously include information about the contents of the order that the QM Application (101) can use to better estimate the time that will be required to fulfill the order, such as the number of items in the order or, at a more detailed level, the identity of each type of item ordered and attributes of each (such as quantity thickness of slice, etc.). The ordering application (106) can receive from the QM Application (101) the status of an order previously placed. This will happen either when the ordering application (106) requests the status (for example, in response to a request by a customer), or when the QM Application (101) automatically provides this information upon change in an order's status. An order's status can be: "Waiting" (still in the service queue), "In Process" (a service person has begun filling the order), or "Complete." The ordering application (106) can cancel a previously submitted order, provided that the status of that order is still "Waiting." In this case, the QMI Application (101) will simply skip over the previously assigned queue number in processing transactions, as if it had never been issued.

Service personnel process customer orders in the service queue by interacting with the QM Application (101) through service-transaction terminals (103), any number of which can be distributed within the work area for the convenience of the service personnel. Any service person can use any transaction terminal (103) at any time. Each transaction is enabled by the identification of the service person conducting the transaction, and is initiated by pressing one of several transaction buttons on the terminal (103). If the transaction terminal is the non-R ID embodiment (503) illustrated in FIG. 5, the service person preferably first touches his/her identification object before touching a transaction button. If the terminal is the RFID-enabled embodiment (700) illustrated in FIG. 7, the identification of the service person is accomplished transparently by reading the REID tag worn by the service person. In the absence of identification, for example, if the service person fails to touch his/her ID object or fails to wear the REID tag, the transaction buttons are not active and touching them has no effect. Service transactions contemplated by the present invention are described below.

The Next-in-Queue transaction button (601) calls forward the next customer in the service queue to place an order. In a preferred embodiment, once this button (601) has been pressed, the QM Application (101) performs several steps. It displays to the service person necessary information about the order on the terminal screen (103), namely the queue number of the next order to be fulfilled and where the service person will find the order information (counter customer or printer (105)). It increments the "Now Serving" number, displayed on the customer information display (104) (typically the same queue number displayed on the transaction terminal (103)), and displays an icon, picture, or other graphical object indicative of the ordering channel (e.g., counter or kiosk) through which the order is being placed. If the next order in queue is a counter customer, and if the customer information display (104) includes the optional speakers, the QM Application (101) causes a digital audio voice message to be emitted through the speakers announcing the "Now Serving" number. If the customer information display (104) does not include these speakers, the service person fulfilling the order calls out the queue number. The customer holding the queue ticket must then answer the call forward, present the ticket to the service person in order to validate his/her queue position, and verbally communicate the order. In another embodiment, if the queue number has been sent to the customer's mobile device, the customer may preferably present his/her mobile device to the service person displaying the queue number. If no customer answers the call within a reasonable time, the queue position is considered abandoned and the service person is free to initiate another service transaction. If the order being served is from a kiosk customer, the QM Application (101) prints the order on the order printer (105), and preferably sends a status update to the deli application (101) to reflect the change in order status from "Waiting-n-Queue" to "In-Process." The information on the printed order would advantageously include the queue number and the contents of the order based on the information provided by the ordering application (106) at the time the order was submitted.

The most common business rule for handling the situation when a customer misses the call forward of his/her queue number and returns to the service counter requesting service is to have the next available service person take the order, allowing the missed queue number to maintain its priority since it is lower than any number still waiting for service. The purpose of the "Missed Queue Number" (602) transaction is to enable the QM Application (101) to account for such out-of-sequence order fulfillment while still maintaining the integrity of the queue. The service person taking the order simply presses the "Missed Queue Number" transaction button (602) instead of the "Next-in-Queue" button (601) and takes the order from the customer. Obviously, there is no need for a call-forward announcement, and the "Now Serving" number shown on the customer display (104) does not change. In another embodiment, when the service person presses the "Missed Queue Number," if the customer has associated his/her mobile device with entry of the service queue, an alert may be sent to the user's mobile device to notify the customer that his/her queue number was missed. This preferably will give the customer notice to return to the service counter and take further action as desired. The Going-Off-Duty transaction button (601) is used by service personnel to take themselves out of the active server pool, either temporarily (e.g., they need to perform other tasks, such as prep, cleanup) or permanently (e.g., end of shift).

The touch of either a "Next-in-Queue" (601) or "Missed-Queue-Number" transaction button (602) marks the start of a service transaction, but there is no explicit completion-of-transaction input into the QM Application (101). Instead, the next touch of any of the transaction buttons by the same service person is automatically considered to mark the end of the previous transaction by that server. Upon the completion of a Next-in-Queue transaction (601) for an order from a kiosk customer, the QM Application (101) preferably sends a status update to the ordering application (106) to reflect the change in order status from "In-Process" to "Complete."

Figure 9B:
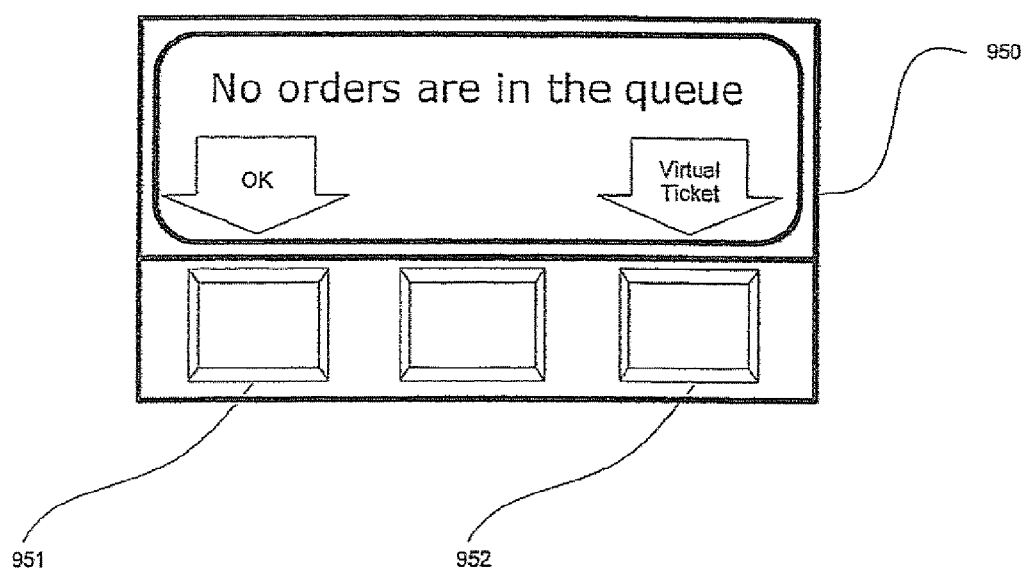
FIG. 9b shows an example of what would preferably be displayed on the screen of the REID-enabled transactional terminal depicted in FIG. 6 when an associate attempts to execute a "next-in-queue" transaction when there are no orders in the service queue.

Service personnel have no way of knowing when all of the orders waiting in the service queue have been completed; they certainly cannot infer this from the absence of customers waiting in front of the service counter since there can be orders placed through an electronic ordering application (106) still in the queue, or customers shopping nearby may be listening for their queue numbers to be announced. For this reason (and to capture the completion of a finished order), service personnel should preferably press one of the transaction buttons when finished with an order, even if there are no customers waiting at the counter. It will thus be commonplace for a service person to initiate a "Next-in-Queue" transaction (601) when there is not another number in the queue. In this case, the QM Application (101) displays a message on the service-transaction terminal screen (900) that there are no orders in the queue, along with an "OK" button (901) and a "Virtual Ticket" button (902) (to be explained below). FIGS. 9a and 9b depict such a display on the non-RFID-enabled (900) and RFID-enabled (950) embodiments of the service-transaction terminal, respectively. Upon the touch of the "OK" button (901), or after a timeout period with no touch of either button, the terminal returns to the main page (600 or 800).

A common boundary condition, especially during non-peak demand periods, is the appearance of a new customer when the service queue is empty. This condition preferably invokes two features within the QM Application (101): the "New Order" alert, and the Virtual Ticket (902).

When the queue is empty and a new queue position is assigned to a kiosk customer or even to a counter customer, it may be the case that no service person is aware that a "Next-in-Queue" (601) transaction is required. It is therefore highly advantageous for the QM Application (101) to generate a "New Order" alert. For example, such an alert could be communicated through the optional speaker system in the customer information display (104) and/or by continuously flashing a message on all of the service-transaction terminals. Other embodiments may provide for pushing out alerts to customers who have made their presence kown to the store using his/her mobile device, such as the alerts described in commonly assigned U.S. patent application Ser. No. 10/877,093, which is incorporated by reference If the service queue is empty and a counter customer asks to place an order without having taken a ticket, a business rule that forces the customer to take a ticket from the ticket dispenser may be perceived by the customer to be arbitrary and even demeaning. Instead, a service person can simply initiate the "Next-in-Queue" transaction (601) to confirm that the queue is empty, and if that is the case, press the Virtual Ticket button (902) mentioned above. The QM Application (101) treats the touch of the Virual Ticket button (902) as a near-simultaneous press of the ticket-demand button (201) on the ticket dispenser (102) by the customer and press of the "Next-in-Queue" button (601) by the service person, except that no ticket is printed and there is no automated voice announcement accompanying the incrementing of the "Now-Serving" number on the customer information display (104).

In order to maintain the integrity of the service queue, once the Virtual Ticket button (902) has been displayed, the QM Application (101) must reserve the next queue number for use by the Virtual Ticket button (902) for a timeout period, even if other customers submit orders through an electronic ordering application (106) or request a ticket from the ticket dispenser (102). Rather than locking the queue and having to delay responding to the ordering application (106) or printing a ticket, QM Application (101) can hold the next queue number for the virtual ticket, and assign the next higher numbers to subsequent requests for queue numbers. If the Virtual Ticket button (902) is not touched, the reserved queue number will simply not be issued. If another queue number has been issued, though, the audible New Order alert should preferably be generated, since another Next-in-Queue transaction is needed.

It might occasionally happen that a counter customer, having reserved a queue position through the ticket dispenser (102), has a change of mind and now wishes to place his/her order electronically through the kiosk computer instead of waiting to place it directly with a service person. Since customers typically tend to place significantly larger orders through the kiosk computer than through counter service, it would be commercially desirable to encourage kiosk ordering in every way possible. Therefore, an advantageous feature of the QM Application (101) is to allow counter customers who have such a change of mind to place their orders via the kiosk computer without losing their position within the service queue (i.e., to convert their queue positions from the counter-customer channel to the kiosk-customer channel).

For example, in a preferred embodiment, each ticket issued by the ticket dispenser (102) carries a bar-coded representation of the assigned queue number, and an ordering kiosk computer has an integrated barcode scanner. With this embodiment, a customer can scan that barcode at the kiosk computer, causing the ordering application software to pass the queue number to the QM Application (101) and preserve its queue priority for the order that the customer subsequently places through the kiosk. Other embodiments provide that if the customer had the barcode pushed out to his/her mobile device when entering the service queue at the ticket dispenser, the customer then may scan his/her mobile device at the kiosk in order to re-associate the originally assigned ticket dispenser queue number with the kiosk. Similarly, if a customer scans his/her loyalty or reward card at the ticket dispenser and the queue number was associated with that card, the customer may now preferably scan the card at the kiosk in order to re-associate the queue number with the kiosk.

By tracking how many people are in the active server pool at all times, the QM Application (101) can estimate queue-waiting time and time-to-completion for each order for the purpose of providing customers with a realistic expectation of service level. Counter customers will typically be interested in the predicted queue-waiting time to know how long they must wait to place their order or when to return to answer the call forward, whereas kiosk customers will be interested in predicted time-to-completion to know how soon they will be able to pick up their order.

The method for estimating these times in a preferred embodiment is essentially a forward-looking simulation of the processing of orders in the service queue. This simulation will be run any time there is an event or condition that requires a recalculation of predicted wait time, as will be discussed more fully below. The key step in this simulation is first to estimate the order-fulfillment time for each order in the service queue. Thus, each time an order in the service queue is assigned to a service associate, the QM Application (101) uses its predicted fulfillment time for that order to predict when that service associate will become available to fill another order. The complete process simulation is an iterative sequence of looking ahead in time and "assigning" each order in the service queue to the predicted next-available service associate, predicting a completion time for that order by adding its predicted fulfillment time to its predicted start time (the predicted completion time of the previous order for that server), until the start-times and completion-times have been predicted for every order in the queue. The predicted queue-waiting time for any given order is simply the difference between the current clock time and the predicted start time for that order, and the time-to-completion is the difference between current clock time and predicted completion time for Me order.

The accuracy of these predicted queue-waiting times and times-to-completion is primarily a function of the accuracy of the predicted fulfillment time for each order in the queue, and it is possible to apply very sophisticated analytical techniques to historical data produced by the system to make those estimates. For example, since the exact contents of each order submitted through an electronic ordering system are known, the QM Application (101) can estimate the order-fulfillment times for those orders based on that information. At a minimum, the number of items can preferably be used, i.e., a standard fulfillment time-per-item can be multiplied by the number of items. With more extensive analysis of actual order-fulfillment-time data, the predicted fulfillment time for each item in the order could be based on the type of item being ordered (e.g., meat, cheese, salad, etc.) as well as ordering attributes (e.g., quantity or weight, slice-thickness, etc.). Such a granular level of prediction is not possible for counter customers since the contents of the order is never known by the system, but the prediction might well take into account day-of-week and/or time-of-day. Finally, if named-identification mode is used, the predicted fulfillment time for each order could take into consideration the historical productivity of the specific service associate predicted to fulfill each order.

As previously discussed, this simulation should preferably be run whenever there is an event or condition that requires a recalculation of predicted wait time. Such events or conditions include but are not limited to, when a new customer joins the service queue; when there is a change in the composition of the server pool as a result of a New-Server-Login or a Going-Off-Duty transaction; or when the current clock time goes past the predicted completion time for any order, indicating that the actual fulfillment time of that order is greater than the original estimate used in the simulation. In this event, a new completion time is preferably predicted and the simulation is re-run.

Once a simulation has been run and the queue-waiting time for the next queue number to be issued has been predicted, e system can simply adjust it continuously based on the elapsed time since the simulation. For example, if the predicted queue-waiting time is 5 minutes and 10 seconds from a simulation run at exactly 3:00:00 PM, then at 3:00:15 (15 seconds later), the predicted queue-waiting time would be 4 minutes and 55 seconds, i.e., 15 minutes less than the original estimate.

A simplified example of such a simulation, run at 5:32:00 PM on a weekday, is show in FIGS. 10*a*-10*e*. In this example, as shown in FIG. 10*a*, analysis of historical order-fulfillment times has shown that the average length of time required by an average service person to fulfill an order can be predicted by multiplying the number of items in the order by 2.1 "standard" minutes per item. In addition, analysis of historical demand shows that the size of an average order from a counter customer varies based on day of week and time of day, with weekend orders averaging 3.2 items per order and weekday orders average 3.0 items per order during the busy evening hours and 2.5 items per order during the rest of the day.

At the time of the simulation in this example, the pool of service personnel fulfilling orders consists of three people: John, Mary and Fred. As depicted in FIG. 10*b*, the "Productivity Indices" for these service people, based on historical analysis of their order-fulfillment times, are 1.1, 1.0 and 0.9, respectively. This means that Mary's productivity (Index 1.0) is exactly average, i.e., she can fill orders on average at the standard rate of 2.1 minutes per item. John (Index 1.1) takes 10% longer on average to fill orders (or 2.3 minutes per item on average), and Fred (Index 0.9) takes 10% less time on average (1.9 minutes per item).

At the time of the simulation depicted in his analysis, there are six customers wailing in the service queue. As show in FIG. 10*c*, these customers have been assigned queue numbers 55 through 60 inclusive. Queue numbers 55, 57 and 60 have been issued to counter customers, while queue numbers 56, 58 and 59 have been issued to kiosk customers. Since the simulation in this example occurs at 5:32 PM (evening) on a weekday, counter customers are assigned to order 3.0 items each, on average, so that the "standard" fulfillment time (i.e., by a service person of average productivity) is predicted at 6.3 minutes for orders 55, 57 and 60. The standard fulfillment times for kiosk orders 56, 58 and 59 are predicted at 8.4 minutes, 6.3 minutes, and 10.5 minutes based on order sizes of 4 items, 3 items, and 5 items, respectively.

FIG. 10*d* shows the actual simulation of the servicing, of the queue in this example: which is triggered by Mary initiating a "Next-in-Queue" transaction at 5:32 PM. She is assigned the next queue number to be called forward for service, i.e., 55, a counter customer. The predicted fulfillment time for this order is calculated by multiplying Mary's Productivity Index (1.0) times the standard fulfillment time (6.3 minutes for a counter customer), or 6.3 minutes. Mary is then predicted to become free again at 5:38:18 PM, calculated by adding 6 minutes 18 seconds to the current clock time of 5:32:00 PM.

Next, the simulation looks for the next available service person to take queue number 56. Since John is predicted to finish the order the is working on at 5:34:56 PM, which is earlier than Fred at 5:35:41 PM, the simulation "assigns" queue number 56 to John. The predicted fulfillment time for this order is calculated by multiplying the standard predicted time (8.4 minutes) by John's Productivity Index (1.1), yielding 9.2 minutes, which is then added to the predicted start time of 5:34:42 PM to predict a time-of-completion of 5:43:56 PM. Next, the simulation "assigns" queue number 57 to Fred, predicted to start at 5:35:41 PM and take 5.7 minutes (6.3 standard minutes times Fred's Productivity Index of 0.9), completing at 5:41:21 PM.

This procedure continues, then, until all waiting queue numbers have been assigned. Queue number 58 is assigned to Mary, predicted to start at 5:38:18 PM and complete at 5:44:36 PM, Queue number 59 is assigned to Fred, predicted to star at 5:41:21 PM and complete at 5:50:48 PM. Finally, queue number 60 is assigned to John, predicted to start at 5:43:56 PM and complete at 5:50:51 PM.

Based on this simulation, the next queue number to be issued, i.e. number 61, would be assigned to Mary with a predicted call-forward time of 5:44:36 PM. The predicted queue-waiting time for this next queue number to be issued is therefore 12 minutes 36 seconds (the difference between 5:44:36 PM and current time of 5:32:00 PM). Thirty seconds later, at 5:32:30 PM, the predicted queue-waiting time will be 12 minutes 6 seconds, assuming that no event has occurred to require a new simulation.

Another feature in embodiments of the present invention, resulting from its real-time monitoring of service levels, is the ability to generate an alert to management when the service level exceeds a threshold of acceptability. This alerting capability enables management to react immediately to sudden or unexpectedly large peaks in demand by adding service personnel to the server pool, thereby increasing the rate of fulfillment throughput, reducing queue-waiting times, and maintaining acceptable customer-service levels. A preferred measure of service level to use in generating this alert is the predicted queue-waiting time for the next position in the queue, such that when this measure exceeds a specific threshold, an alert is sent to one or designated recipients.

While a full-service deli counter within a retail store (e.g., supermarket) is preferably a place where customers can enter the service queue or place an order through an electronic ordering system, such as a ticket dispenser or kiosk, it should be appreciated that the present invention is not limited in scope to the deli counter or retail store scenario. Other scenarios where embodiments of the present invention may be preferably utilized include but are not limited to service-oriented places, including but not limited to pharmacies bakeries, and restaurants.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for service queue management, said system comprising:
   one or more devices comprising a ticket dispenser, the ticket dispenser comprising:
      a proximity sensor configured to:
         detect a proximity of a user;
         generate an indication to join the service queue based on the detected proximity; and
         cause the request to join the selected service queue to be communicated from the ticket dispenser to the computer based at least in part on the indication;
   a computer having one or more physical processors programmed by computer program instructions that, when executed by the one or more physical processors, cause the computer to:
      receive a request to join a service queue from the one or more devices, wherein the service queue relates to a sequence in which at least a first order to be placed at a department of a retail store and at least a second order to be placed at the department are to be taken;
      generate service queue information based on the request;
      identify, responsive to the request, a promotion for an item available at the department to which the service queue relates; and
      cause the promotion and at least a portion of the service queue information to be communicated to the one or more devices.

2. The system for service queue management of claim 1, wherein the computer is programmed to receive the request via at least one of:
   a mobile communications device, an optical card reader, a magnetic card reader, a biometric sensing device, a keypad, a touch screen, or a radio frequency identification (RFID) interface.

3. The system of claim 1, wherein the service queue information comprises at least one of:
   a queue number, a next queue number to be issued, an estimated wait time for service, a predicted time of service, a time of issuance of ticket, a predicted queue-waiting time, a marketing message, an instruction relating to use of the system, or an average queue-waiting time.

4. The system of claim 1, wherein the service queue information comprises an estimated wait time based on at least one of: the size of an order, the specific items of the order, the slice thickness of the items of the order, the quantity of the items in the order, the weight of the items of the order, an amount of time previous similar orders take to complete based on historical data, or personnel data associated with the order.

5. The system of claim 1, wherein the service queue information comprises an estimated wait time based on at least one of the time of day an order is placed, or the time of week the order is placed.

6. The system of claim 1, wherein the service queue information comprises an estimated wait time based on a productivity index associated with a particular service person fulfilling an order.

7. The system of claim 1, wherein the promotion comprises a coupon for the item available at the department.

8. The system of claim 7, wherein the computer is further programmed to:
   cause the coupon to be applied at a counter associated with the service queue.

9. The system of claim 7, wherein the computer is further programmed to:
   cause the coupon to be applied via a loyalty card account.

10. The system of claim 1, wherein the service queue information comprises an estimated wait time, the computer further configured to:
    cause an alert to be communicated when the estimated wait time exceeds a predefined amount of time.

11. A system for delivering media based on user identification, said system comprising:
    a computer; and
    a ticket dispenser comprising:
       at least one display; and
       a control computer having at least a first physical processor programmed by first computer program instructions that, when executed by the first physical processor, programs the ticket dispenser to:
          receive identification information associated with a user;
          generate a request to join a service queue for a department of a retail store from the ticket dispenser, wherein the service queue relates to a sequence in which at least a first order to be placed at the department and at least a second order to be placed at the department are to be taken; and
          communicate, together or separately, the identification information and the request to the computer,
    wherein the computer comprises at least a second physical processor programmed by second computer program instructions that, when executed by the second physical processor, programs the computer to:
       receive the identification information and the request to join the service queue;

generate service queue information based on the request;

identify, responsive to the request, a promotion for an item available at the department to which the service queue relates based on the identification information; and cause the promotion and at least a portion of the service queue information to be communicated to the ticket dispenser.

12. The system of claim 11, wherein the control computer is programmed to receive the identification information via at least one of: an optical card reader, a magnetic card reader, a biometric sensing device, a keypad, a touch screen, or a radio frequency identification (RFID) interface.

13. The system of claim 11, wherein the control computer is programmed to receive the identification information via a mobile device.

14. The system of claim 11, wherein the identification information comprises at least one of:

a telephone number, an email address, a text message address, a personal identification number (PIN), a bar code, or a loyalty/reward card number.

15. The system of claim 11, wherein the computer is programmed to:

identify a mobile device associated with the user based on the identification information; and cause the promotion and the at least a portion of the service queue information to be communicated to the mobile device.

16. The system of claim 11, wherein the computer is programmed to cause the promotion and the at least a portion of the service queue information to be communicated to the at least one display of said ticket dispenser.

17. The system of claim 11, wherein the service queue information comprises an estimated wait time based on at least one of: the size of an order, the specific items of the order, the slice thickness of the items of the order, the quantity of the items in the order, the weight of the items of the order, an amount of time previous similar orders take to complete based on historical data, or personnel data associated with the order.

18. The system of claim 11, wherein the service queue information comprises an estimated wait time based on at least one of the time of day an order is placed or the time of week the order is placed.

19. The system of claim 11, wherein the service queue information comprises an estimated wait time based on a productivity index associated with a particular service person fulfilling the order.

20. The system of claim 11, wherein the promotion comprises a coupon.

21. The system of claim 20, wherein the control computer is programmed to communicate the coupon to a mobile device.

22. The system of claim 11, wherein the promotion is determined based on a purchase history associated with the identification information.

23. The system of claim 11, wherein the ticket dispenser further comprises:

a proximity sensor configured to:
  detect a proximity of a user;
  generate an indication to join the service queue based on the detected proximity; and
  cause the indication to be communicated to the control computer, wherein the control computer communicates the request to join the service queue based at least in part on the indication.

24. A ticket dispenser comprising:

one or more physical processors programmed by computer program instructions that, when executed by the one or more physical processors, cause the ticket dispenser to:
  receive an indication to join a service queue from one or more devices, wherein the service queue relates to a sequence in which at least a first order to be placed at a department of a retail store and at least a second order to be placed at the department are to be taken;
  communicate a request to join the service queue based on the indication to a computer remote from the ticket dispenser;
  receive, responsive to the request, service queue information and a promotion for an item available at the department to which service queue relates from the computer remote from the ticket dispenser; and
  cause the promotion and at least a portion of the service queue information to be communicated to a user; and a proximity sensor configured to:
  detect a proximity of the user;
  generate the indication to join the service queue based on the detected proximity; and
  communicate the indication to the one or more physical processors.

25. The ticket dispenser of claim 24, wherein the ticket dispenser further comprises:

at least one manually-activated device, and wherein the indication to join the service queue is based on an actuation of the at least one manually-activated device.

26. The ticket dispenser of claim 24, wherein the ticket dispenser is further programmed to:

receive a user identification via at least one of: an RFID sensor, a telephone, a pager, or a PDA; and provide the user identification to the computer remote from the ticket dispenser, wherein the promotion is based further on the user identification.

27. The ticket dispenser of claim 24, wherein the ticket dispenser further comprises:

a printer configured to print the promotion and the at least a portion of the service queue information.

28. The ticket dispenser of claim 24, wherein the ticket dispenser further comprises:

at least one display screen configured to display the promotion and the at least a portion of the service queue information.

29. The ticket dispenser of claim 24, wherein the service queue information comprises at least one of:

a queue number, a next queue number to be issued, an estimated wait time for service, a predicted time of service, a time of issuance of ticket, a predicted queue-waiting time, one or more marketing messages, one or more instructions for use of the ticket dispenser, or average queue-waiting time.

30. The ticket dispenser of claim 24, wherein one or more alerts related to the service queue are transmitted to a mobile device associated with the user.

31. The system of claim 24, wherein the service queue information comprises an estimated wait time based on at least one of: the size of an order, the specific items of the order, the slice thickness of the items of the order, the quantity of the items in the order, the weight of the items of the order, an amount of time previous similar orders take to complete based on historical data, or personnel data associated with the order.

32. The system of claim 24, wherein the service queue information comprises an estimated wait time based on at least one of the time of day the order is placed or the time of week the order is placed.

33. The system of claim 24, wherein the service queue information comprises an estimated wait time based on a productivity index associated with a particular service person fulfilling the order.

34. The ticket dispenser of claim 12, further comprising:
a display configured to display the at least a portion of the service queue information;
wherein the processor is further programmed to:
cause an electronic or paper queue ticket to be offered;
determine that the electronic or paper queue ticket was not accepted; and
determine a reason that the electronic or paper queue ticket was not accepted based on the at least a portion of the service queue information that was displayed.

35. A ticket dispenser for managing more than one service queue, said ticket dispenser comprising:
a physical processor programmed by computer program instructions that, when executed by the physical processor, cause the ticket dispenser to:
provide a selectable plurality of different types of service queues each related to a department of a retail store, wherein a given service queue relates to a sequence in which at least a first order to be placed at a given department and at least a second order to be placed at the given department are to be taken;
receive a selection of one of the plurality of different types of service queues; and
communicate a request to join a service queue associated with the selected one of the plurality of different types of service queues to a computer remote from the ticket dispenser;
receive, responsive to the request, service queue information associated with the service queue and a promotion for an item available at a department associated with the service queue from the computer remote from the ticket dispenser; and
cause the promotion and at least a portion of the service queue information to be communicated to a user.

36. The ticket dispenser of claim 35, wherein the ticket dispenser further comprises:
a plurality of display screens each associated with a corresponding one of the plurality of different types of service queues.

37. The system of claim 35, wherein the service queue information comprises an estimated wait time based on at least one of: the size of an order, the specific items of the order, the slice thickness of the items of the order, the quantity of the items in the order, the weight of the items of the order, an amount of time previous similar orders take to complete based on historical data, or personnel data associated with the order.

38. The system of claim 35, wherein the service queue information comprises an estimated wait time based on at least one of the time of day an order is placed or the time of week the order is placed.

39. The system of claim 35, wherein the service queue information comprises an estimated wait time based on a productivity index associated with a particular service person fulfilling an order.

40. The ticket dispenser of claim 35, wherein the plurality of different types of service queues are associated with at least one of: a bakery, a deli, a pre-prepared foods section, a sushi section, or a pharmacy.

41. The ticket dispenser of claim 35, further comprising:
a display screen configured to toggle between the plurality of different types of service queues.

42. The ticket dispenser of claim 35, wherein the ticket dispenser further comprises:
a proximity sensor configured to:
detect a proximity of the user;
generate an indication to join the service queue based on the detected proximity; and
cause the indication to be communicated to the physical processor, wherein the physical processor communicates the request to join the service queue based at least in part on the indication.

43. A system for alerting a user to service queue related information, said system comprising:
a computer having one or more physical processors programmed by computer program instructions that, when executed by the one or more physical processors, cause the computer to:
receive a request, from one or more devices, to join a service queue selected from among a plurality of different types of service queues, wherein a given service queue relates to a sequence in which at least a first order to be placed at a given department and at least a second order to be placed at the given department are to be taken;
generate service queue information based on the selected service queue;
identify, responsive to the request, a promotion for an item available at a department associated with the selected service queue; and
cause at least a portion of the service queue information and the promotion to be communicated to the one or more devices, wherein the one or more devices comprise a ticket dispenser, the ticket dispenser comprising:
a proximity sensor configured to:
detect a proximity of a user;
generate an indication to join the service queue based on the detected proximity; and
cause the request to join the service queue to be communicated from the ticket dispenser to the computer based at least in part on the indication, and wherein the computer is programmed to cause the at least a portion of the service queue information to be communicated via the ticket dispenser.

44. The system of claim 43, wherein the one or more devices comprise a mobile communications device, and wherein the computer is programmed to cause the at least a portion of the service queue information to be communicated via the mobile communications device.

45. The system of claim 43, wherein the service queue information comprises an estimated wait time based on at least one of: the size of an order, the specific items of the order, the slice thickness of the items of the order, the quantity of the items in the order, the weight of the items of the order, an amount of time previous similar orders take to complete based on historical data, or personnel data associated with the order.

46. The system of claim 43, wherein the service queue information comprises an estimated wait time based on at least one of the time of day an order is placed or the time of week the order is placed.

47. The system of claim 43, wherein the service queue information comprises an estimated wait time based on a productivity index associated with a particular service person fulfilling an order.

48. A ticket dispenser comprising:
one or more physical processors; and
a proximity sensor configured to:
- detect a proximity of a user;
- generate an indication to join a service queue based on the detected proximity; and
- communicate the indication to the one or more physical processors, wherein the one or more physical processors are programmed by computer program instructions that, when executed by the one or more physical processors, cause the ticket dispenser to:
- receive the indication to join the service queue from the proximity sensor;
- communicate a request to join the service queue to a computer remote from the ticket dispenser based on the indication;
- receive service queue information and a promotion related to the service queue from the computer; and
- cause the promotion and at least a portion of the service queue information to be communicated to the user.

49. The ticket dispenser of claim 48, further comprising:
a display configured to display the at least a portion of the service queue information;
wherein the ticket dispenser is further programmed to
- cause an electronic or paper queue ticket to be offered;
- determine that the electronic or paper queue ticket was not accepted; and
- determine a reason that the electronic or paper queue ticket was not accepted based on the at least a portion of the service queue information that was displayed.

* * * * *